US009963365B2

(12) United States Patent
Duttlinger, Jr. et al.

(10) Patent No.: US 9,963,365 B2
(45) Date of Patent: May 8, 2018

(54) PROCESS AND SYSTEM FOR DEWATERING OIL SANDS FINE TAILINGS

(71) Applicant: ECOLAB USA INC., Naperville, IL (US)

(72) Inventors: William T. Duttlinger, Jr., Oswego, IL (US); Anoop Chengara, Hoffman Estates, IL (US); Kimberly Jantunen Cross, Hoffman Estates, IL (US); Anthony G. Sommese, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 973 days.

(21) Appl. No.: 13/800,808

(22) Filed: Mar. 13, 2013

(65) Prior Publication Data
US 2014/0054232 A1  Feb. 27, 2014

Related U.S. Application Data

(60) Provisional application No. 61/691,655, filed on Aug. 21, 2012.

(51) Int. Cl.
*C02F 1/54* (2006.01)
*C02F 1/56* (2006.01)
*C02F 103/10* (2006.01)

(52) U.S. Cl.
CPC ............ *C02F 1/54* (2013.01); *C02F 1/56* (2013.01); *C02F 2103/10* (2013.01)

(58) Field of Classification Search
CPC .. C02F 1/56; C02F 1/5209; C02F 9/00; C02F 1/283; C02F 1/42; C02F 1/443; C02F 1/52; C02F 1/385; C02F 3/1268; C02F 3/1273; C02F 2001/425; C02F 2001/5218; C02F 2101/101; C02F 2101/20; C02F 2101/30; C02F 2103/32
See application file for complete search history.

(56) References Cited

U.S. PATENT DOCUMENTS 1,987,454 A   1/1935 Vandercook
3,929,629 A   12/1975 Griffith et al.
(Continued)

FOREIGN PATENT DOCUMENTS

CA    2768522 A1    8/2012
WO    2011032258 A1   3/2011

OTHER PUBLICATIONS

Norma Moss Gric and Brian Dymond Lric, Flocculation: Theory & Application, 1978, pp. 2-4 and 7.*
(Continued)

*Primary Examiner* — Bobby Ramdhanie
*Assistant Examiner* — Donovan Bui-Huynh
(74) *Attorney, Agent, or Firm* — Kagan Binder, PLLC

(57) ABSTRACT

A dewatering process comprises dispersing an anionic polymer flocculant in a slurry comprising water and oil sands fine tailings to form flocs comprising fines bridged by the anionic polymer flocculant. A cationic polymer flocculant is subsequently dispersed in the flocculated slurry to further flocculate the flocs and form floc aggregates. The floc aggregates comprise flocs bridged by the cationic polymer flocculant. The floc aggregates are then compressed to remove water and form a dewatered compact. A system is also provided for the dewatering processes using inline mixtures and a filter press.

16 Claims, 16 Drawing Sheets

(56) References Cited

U.S. PATENT DOCUMENTS

| | | | |
|---|---|---|---|
| 4,209,301 A | 6/1980 | Nicol et al. | |
| 4,340,467 A | 7/1982 | Wang et al. | |
| 4,363,724 A | 12/1982 | Panzer et al. | |
| 4,734,206 A | 3/1988 | Clayfield et al. | |
| 5,720,887 A * | 2/1998 | Vasconcellos | C02F 1/56 210/727 |
| 5,993,670 A * | 11/1999 | Knauer | B01F 5/0453 210/136 |
| 6,217,778 B1 * | 4/2001 | Shing | C02F 1/5245 162/189 |
| 9,068,776 B2 * | 6/2015 | Bugg | F26B 5/00 |
| 2001/0010198 A1 | 8/2001 | Forbes | |
| 2004/0055962 A1 * | 3/2004 | Golden | C02F 1/56 210/725 |
| 2007/0187332 A1 * | 8/2007 | Whittaker | C02F 11/14 210/723 |
| 2010/0101981 A1 * | 4/2010 | Moffett | C04B 28/24 208/391 |
| 2010/0331484 A1 * | 12/2010 | Swift | C02F 1/56 524/595 |
| 2011/0203999 A1 * | 8/2011 | Simpson | B01D 25/127 210/710 |
| 2011/0253599 A1 | 10/2011 | Cross et al. | |
| 2012/0138542 A1 * | 6/2012 | Dang-Vu | B01F 5/102 210/723 |
| 2012/0318718 A1 * | 12/2012 | Simpson | C10G 31/09 208/391 |
| 2013/0336877 A1 * | 12/2013 | Soane | C02F 1/56 423/580.1 |
| 2014/0054232 A1 * | 2/2014 | Duttlinger, Jr. | C02F 1/54 210/710 |
| 2015/0176893 A1 * | 6/2015 | Revington | B09C 1/08 34/381 |
| 2015/0259231 A1 * | 9/2015 | Webber | C02F 1/66 210/706 |

OTHER PUBLICATIONS

International Preliminary Report on Patentability dated Feb. 24, 2015 in PCT/US2013/055913.

International Search Report dated Nov. 19, 2013 in PCT/US2013/055913.

Demoz and Mikula, "Role of Mixing Energy in the Flocculation of Mature Fine Tailings", J. Environ. Eng., 2012, 138(1), 129-136.

Energy Resources Conservation Board of Alberta, "Directive 074: Tailings Performance Criteria and Requirements for Oil Sands Mining Schemes", Feb. 3, 2009, pp. 1-14.

\* cited by examiner

PROCESS AND SYSTEM FOR DEWATERING OIL SANDS FINE TAILINGS

CROSS REFERENCE TO RELATED APPLICATIONS

This application claims the benefit of U.S. Provisional Patent Application Ser. No. 61/691,655, filed Aug. 21, 2012, and entitled "Process and System for Dewatering Oil Sands Fine Tailings," the entire contents of which are incorporated herein by reference.

FIELD

The present invention relates generally to methods and systems for dewatering oil sands fine tailings, and particularly to methods and systems for dewatering oil sands fine tailings through the use of an anionic flocculant and a cationic flocculant.

BACKGROUND

Recovery or extraction of bitumen from oil sands, also commonly referred to as tar sands or bituminous sands, is often achieved by a water-based process. Such a process generates tailings, which typically comprises sands, fines, clays, minerals and residual bitumen in water. The tailings are typically transported and stored within surface tailings ponds, where the solids settle out of the tailings and water is released. When deposited in a tailings pond, the fine fraction of the tailings accumulates to form fluid fine tailings, which typically settle in a few years to form mature fine tailings (MFT). The MFT typically behaves as a fluid-like colloidal material and can remain in a fluid-like state for decades due to its slow rate of consolidation. Over the years, large volumes of MFT have been accumulated in the tailings ponds and new tailings ponds are required to store newly generated tailings. It is desirable to accelerate recovery of water trapped in the MFT and conversion of MFT into deposits that would become trafficable and ready for reclamation. For example, the Canadian Energy Resources Conservation Board has issued Directive 074 "Tailings Performance Criteria and Requirements for Oil Sands Mining Schemes", which requires the deposits converted from fluid tailings including MFT to achieve a minimum undrained shear strength of 5 kPa within one year and 10 kPa after five years such that the deposits can be trafficable.

SUMMARY

According to an aspect of the present invention, there is provided a dewatering process. The process comprises dispersing an anionic flocculant in a slurry comprising oil sands fine tailings to form a flocculated slurry, wherein sufficient water is in the slurry to allow uniform dispersion of polymer flocculants and reconfiguration of polymer flocculants in the slurry, and wherein the anionic flocculant is an anionic polymer selected to flocculate fines to form flocs comprising fines bridged by the anionic polymer and having an average floc size in the range of 100 to 10,000 µm. The process further comprises dispersing a cationic flocculant in the flocculated slurry, wherein the cationic flocculant is a cationic polymer having a molecular weight of at least 5,000,000 Da and is selected to further flocculate the flocs to form floc aggregates comprising flocs bridged by the cationic polymer and having an average aggregate size in the range of 100 to 10,000 µm. The floc aggregates are compressed to remove water and form a dewatered compact.

The slurry may have a solid content of less than 35 wt %, such as less than 20 wt %, and the compact may have a water content of less than 55% by weight. The anionic polymer may have an anionic mole charge from about 30% to about 40%, and may be a polyacrylamide, a polyacrylate, a poly (meth)acrylate, a poly 2-acrylamido-2-methylpropoane sulfonic acid, an acrylamide sodium acrylate copolymer, an acrylamide sodium(meth)acrylate copolymer, an acrylamide/ammonium acrylate copolymer, an acrylamide ammonium(meth)acrylate copolymer, an acrylamide sodium 2-acrylamido-2-methylpropane sulfonic acid copolymer, an acrylamide ammonia 2-acrylamido-2-methylpropane sulfonic acid copolymer, a hydrolyzed acrylamide (to acrylic add) 2-acrylamido-2-methylpropane sulfonic add copolymer, or an acrylamide 2-acrylamido-2-methylpropane sulfonic acid/ammonium acrylate terpolymer. The anionic polymer may be an acrylamide sodium acrylate having a molecular weight of at least 5,000,000 Da, and the anionic mole charge may be about 30%. The cationic polymer may have a cationic mole charge from about 30% to about 70%, and may be a polyacrylamide (AcAm), a polydimethylaminoethylacrylate methyl chloride (DMAEA.MCQ), a polydimethylaminoethylmethacrylate methyl chloride (DMAEM.MCQ), a polydimethylaminoethylmethacrylate methyl sulfate (DMAEM.MSQ), a polydimethylaminoethylacrylate methyl sulfate (DMAEA.MSQ), a polydimethylaminoethylmethacrylate benzyl chloride (DMAEM.BCQ), a polydimethylaminoethylacrylate benzyl chloride (DMAEA.BCQ), a polytrimethylammonium propyl methacrylamide chloride (MAPTAC), a polyacrylamidopropyltrimethylammonium chloride (APTAC), an AcAm-DMAEA.MCQ copolymer, an AcAm-DMAEM.MCQ copolymer, an AcAm-DMAEM.MSQ copolymer, an AcAm-DMAEA.MSQ copolymer, an AcAm-DMAEM.BCQ copolymer, an AcAm-DMAEA.BCQ copolymer, an AcAm-MAPTAC copolymer, or an AcAm-APTAC copolymer. The cationic polymer may be a polyacrylamide-polydimethylaminoethylacrylate methyl chloride copolymer and the cationic mole charge is about 50%. The cationic polymer may be a linear or branched polyacrylamide polydimethylaminoethylacrylate methyl chloride copolymer, and the cationic mole charge may be 50%, 65%, or 70%. The anionic flocculant may be dispersed in the slurry at a dosage of about 1 to about 2 kg/DT solids; and the cationic flocculant may be dispersed in the flocculated slurry at a dosage of at about 0.1 to about 1 kg/DT solids. Before compressing the floc aggregates, a cationic coagulant may be dispersed in the flocculated slurry to coagulate unflocculated fines. The cationic coagulant may be an epichlorohydrin/dimethyl amine polymer or a diallyldimethylammonium chloride polymer, and the cationic coagulant may have an intrinsic viscosity between about 0.08 to about 1.3 dL/g. The cationic coagulant may be dispersed in the flocculated slurry at a dosage of about 0.1 to about 1.5 kg/DT solids. The floc aggregates may be compressed with a filter press to form the compact. The floc aggregates may be compressed for a sufficient time to form a compact having a shear strength of 5 kPa or higher and a solids content of about 47 wt % or higher. Water may be added to the slurry before dispersing the anionic polymer flocculant in the slurry. The dispersion of the anionic polymer flocculant and cationic polymer flocculant may comprise: flowing a stream of the slurry through a conduit; injecting the anionic polymer into the stream through a first inline mixer coupled to the conduit; and injecting the cationic polymer into the stream through a second inline mixer coupled to the conduit downstream of the first inline mixer. Each of the first and second inline mixers may comprise an inlet for receiving the respective flocculant, a rotatable distribution head disposed in the conduit, comprising mixing blades and distributed flocculant outlets in fluid communication with the inlet, and a variable speed rotator for rotating the distribution head at a speed selected to adjust the mixing energy impacted to the stream. The flow rate of the stream in the conduit, the rate of injection of the anionic polymer and rate of injection of the cationic polymer, and the speed of rotation of the distribution head may be selected to optimize flocculation in the flocculated slurry.

In another aspect, there is provided a system for dewatering oil sands fine tailings. The system comprises a conduit comprising a first end and a second end for a slurry comprising water and oil sands fine tailings to flow from the first end to the second end; a first inline mixer coupled to the conduit and a second inline mixer coupled to the conduit downstream of the first inline mixer, each comprising an inlet, a rotatable distribution head disposed in the conduit and comprising mixing blades and distributed flocculant outlets in fluid communication with the inlet, and a variable speed rotator for rotating the distribution head; a source of an anionic flocculant, connected to the inlet of the first inline mixer, the anionic flocculant comprising an anionic polymer selected to flocculate fines in the slurry to form flocs comprising fines bridged by the anionic polymer; and a source of a cationic flocculant, connected to the inlet of the second inline mixer, the cationic flocculant comprising a cationic polymer selected to further flocculate the flocs to form floc aggregates comprising flocs bridged by the cationic polymer; and a filter press for compressing the floc aggregates to remove water and form a dewatered compact.

The system may further comprise a buffer tank for receiving the flocculated slurry for partial separation of water from the floc aggregates prior to delivering the floc aggregates to the filter press to further remove water. The system may also comprise a first polymer dosing unit for controlling the dosage of the anionic polymer delivered into the conduit through the first inline mixer, and a second polymer dosing unit for controlling the dosage of the cationic polymer delivered into the conduit through the second inline mixer. The system may comprise a mixing tank in fluid communication with the input end of the conduit, for mixing oil sands fine tailings and water to form the slurry. The anionic flocculant may be an anionic polymer selected to flocculate fines in the slurry to form flocs comprising fines bridged by the anionic polymer and having an average floc size of 100 to 10,000 μm, and the cationic flocculant may be a cationic polymer having a molecular weight of at least 5,000,000 Da and selected to further flocculate the flocs to form floc aggregates comprising flocs bridged by the cationic polymer and having an average aggregate size of 100 to 10,000 μm. The anionic polymer may be an acrylamide sodium acrylate having a molecular weight of at least 5,000,000 Da and an anionic mole charge of about 30%. The cationic polymer may be an acrylamide-dimethylaminoethylacrylate methyl chloride copolymer and have a cationic mole charge of about 50%.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of examples only, embodiments of the present invention.

DETAILED DESCRIPTION

Figure 1:
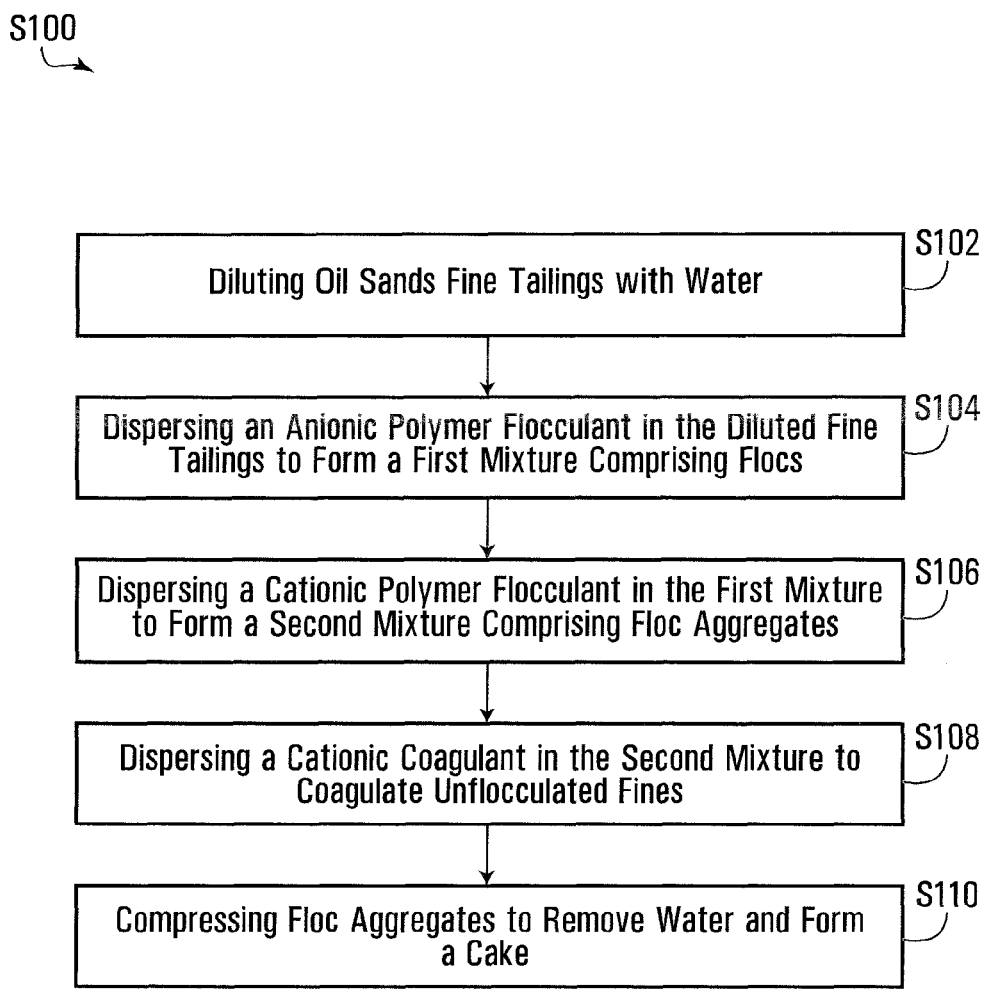
FIG. 1 is a flow chart of a dewatering process, exemplary of an embodiment of the present invention.

In overview, it has been recognized that a dewatering process using a dual flocculant system can be used to dewater oil sands fine tailings. In an example dewatering process, oil sands fine tailings may be diluted with water to allow uniform dispersion of polymer flocculants, and reconfiguration of the polymer flocculants in the oil sands fine tailings. An anionic polymer flocculant is dispersed in a slurry containing diluted oil sands fine tailings to form a flocculated slurry, wherein the anionic polymer flocculant causes the fines in the slurry to flocculate and form flocs. The flocs are expected to contain fines bridged by the anionic polymer flocculant. A cationic polymer flocculant is subsequently dispersed in the flocculated slurry to further flocculate the flocs and form floc aggregates. The floc aggregates are expected to contain flocs bridged by the cationic polymer flocculant. The floc aggregates can then be compressed to remove water and form a dewatered compact such as a cake. The cake may have a water content of less than 55% by weight.

In a selected embodiment, before compressing the floc aggregates, a cationic coagulant may be dispersed in the flocculated slurry to coagulate the unflocculated fines in the slurry into larger clusters.

In another selected embodiment, the flocculated slurry may be passed through a filter press to compress the floc aggregates into the cake.

Conveniently, the dewatering process may be carried out by a system described herein. Such a dewatering system may include (i) a source of oil sands fine tailings, which are mixed with sufficient water to allow uniform dispersion and reconfiguration of the polymer flocculants in the oil sands fine tailings; (ii) a source of an anionic polymer flocculant, which flocculates fines in the oil sands fine tailings to form flocs; (iii) a source of a cationic polymer flocculant, which further flocculates the flocs to form floc aggregates; (iii) at least one mixer which is connected to the sources for mixing the anionic polymer flocculant with the oil sands fine tailings for form the flocs and for mixing the cationic polymer flocculant to form the floc aggregates; and (iv) a filter press for compressing the floc aggregates to remove water and form a cake.

In a selected embodiment, the dewatering system may further include a buffer tank in fluid communication with the mixer and with the filter press. The buffer tank may allow partial removal of free water that has been released during the flocculation process prior to feeding the floc aggregates to the filter press.

In selected embodiments, the mixer may be a tank. In other selected embodiments, the mixer may be an inline-mixer.

Example embodiments of the dewatering process and system described herein have been tested and found to be effective and efficient for dewatering oil sands fine tailings to form flocs and floc aggregates that have sufficient strength and integrity to withstand compression to produce dewatered compacts such as cakes with a filter press, and the cakes produced from the sample floc aggregates could meet the requirements of Directive 074.

An example process flow chart for dewatering oil sands fine tailings is illustrated in FIG. 1. The process S100 may include providing the oil sands fine tailings mixed with sufficient water (S102); dispersing an anionic polymer flocculant to the oil sands fine tailings to form a first mixture comprising flocs (S104); dispersing a cationic polymer flocculant to the first mixture to form a second mixture comprising floc aggregates (S106), and compressing the floc aggregates to remove water and form a cake (S110). Optionally, after formation of the second mixture, a cationic coagulant may be dispersed in the second mixture to coagulate the unflocculated fines (S108).

In various embodiments, the oil sands fine tailings refer to tailings from oil sands extraction operations and from froth treatment to recover bitumen obtained from the extraction operations. They include mature fine tailings from tailings ponds and fine tailings from ongoing extraction operations that may bypass tailings ponds, and combinations thereof. The abbreviation MFT used herein generally refers to fine tailings from oil sand extraction operations, including mature fine tailings and fine tailings from ongoing extraction operations.

Compositions of MFT vary with their origin, including the composition of the oil sands, extraction process and age. Typically, neat MFT contain approximately 15 wt % to 37 wt % solids, approximately 97% of which are fines, and approximately 1 wt % residual bitumen, and the balance is water. The fines in MFT may typically have a particle size distribution as follows: $d_{10}=0.4$ μm, $d_{50}=3.6$ μm, $d_{90}=19.9$ μm. For example, MFT may include about 35 wt % solids with $d_{50}$ being about 6 μm. In some cases, neat MET may include about 35 to 37 wt % solids with $d_{50}$ being about 6 μm, and about 1 wt % bitumen in water.

The term "fines" refers to solid particles with sizes of about 44 μm or smaller in their native states. The particle sizes of fines may be measured using a method generally recognized and accepted in the oil sands industry, such as a sieve hydrometer analysis.

At S102, the MFT may be mixed with water to facilitate uniform dispersion and reconfiguration of the polymer flocculants in the MET. When neat MFT is used (i.e. without additional water), uniform dispersion of the polymer flocculants therein is difficult to achieve, which can result in insufficient flocculation. Diluting the MFT with sufficient water prior to flocculation can facilitate uniform dispersion of the polymer flocculants and allow the polymer flocculants to reconfigure for efficient flocculation of the MFT at S104 and S106.

Typically, water may be added to the MFT such that the resulting MFT may have a solid content of less than 20 wt %. In some embodiments, the diluted MFT may have a solid content of about 18 or about 19 wt %. In some other embodiments, the diluted MFT may have a solid content of between 15 to 20 wt %. However, it should be noted that the present embodiment may be modified and in some applications, the initial slurry may have a higher or lower solid content. For example, in some applications, the solid content may be less than or equal to 35 wt %.

At S104, the anionic polymer flocculant may be dispersed in the MFT to form the first mixture comprising flocs and the flocs may be allowed to form.

In selected embodiments, the anionic polymer flocculant may be selected to flocculate fines to form flocs comprising fines bridged by the anionic polymer flocculant and having an average floc size in the range of 100 to 10,000 μm.

In selected embodiments, the anionic polymer flocculant may be an anionic polyacrylamide (AcAm), polyacrylate, poly(meth)acrylate, poly 2-acrylamido-2-methylpropoane sulfonic acid (AMPS), acrylamide sodium acrylate (AcAm-NaAc) copolymer, acrylamide-sodium(meth)acrylate copolymer, acrylamide ammonium acrylate (AcAm-AA) copolymer, acrylamide ammonium(meth)acrylate (AcAm-AMA) copolymer, acrylamide sodium AMPS copolymer, acrylamide ammonia AMPS copolymer, hydrolyzed acrylamide (to acrylic acid) AMPS copolymer, or AcAm-AMPS-AA terpolymer.

In some embodiments, the anionic polymer flocculant may be an AcAm (50 mole %)-AMPS(15-25 mole %)-AA (remainder) terpolymer, or an AcAm (70 mole %)-AA(30 mole %) copolymer.

For example, a suitable anionic polymer flocculant may be a 30% mole charge AcAm—NaAc copolymer (RSV: 29-37 dL/g; IV>19 dL/g; MW>5,000,000 Da), or a 40% mole charge AcAm—NaAc copolymer (RSV: 28.0-36.6 dL/g, IV: 19.9 dL/g; MW>5,000,000 Da). In some embodiments, a 30% mole charge AcAm—NaAc copolymer (RSV: 41-50 dL/g; IV: 31.7 dL/g; MW>5,000,000 Da), or a 30% mole charge AcAm—NaAc copolymer (MW>5,000,000 Da) may be used. Suitable anionic polymer flocculants are commercially available, for example, from Nalco (an Ecolab Company), Ciba, Cytec, SNF, or BASF.

As will be readily appreciated by a skilled person in the art, reduced specific viscosity (RSV) is an indication of polymer chain length and average molecular weight. The RSVs stated herein are measured in 1 M $NaNO_3$ salt concentration and buffer at 450 mg/L polymer active concentration at 30° C. Anionic polymers are buffered in carbonate buffer to maintain pH above 8 and cationic polymers (described below) are buffered in acetate buffer to maintain pH around 4.5. Intrinsic viscosity (IV) used herein is determined by methods known in the art. For example, IV may be determined using a viscometer, which measures the viscosity average molecular weight of a polymer by the Mark-Houwink equation, with higher IV values denoting higher molecular weight. Molecular weight used herein is determined by gel permeation chromatography (GPC), which measures the molecular weight distribution of a polymer. As the detection limit for the GPC instrument used is 1,000,000 Da; the molecular weight stated herein are estimates.

In selected embodiments, the anionic polymer flocculant may have a molecular weight greater than about 5,000,000 Da and an anionic mole charge in the range of about 30 to about 40%.

The anionic polymer flocculent may be dispersed in the MFT in its original form, e.g. as dry solids, or as emulsions such as latex emulsions, or as aqueous solutions or suspensions. In some embodiments, the anionic polymer flocculant may be dispersed as an aqueous solution. In a specific embodiment, the anionic polymer may be dispersed as a 0.15 wt % solution in water (on a polymer actives basis).

The technique for dispersing the anionic polymer flocculant is within the knowledge of those skilled in the art. In some embodiments, the anionic polymer flocculent may be dispersed in the MFT from a feeder such as a polymer dosing unit, followed by stirring. Suitable polymer dosing units are discussed below with reference to FIG. 3.

In some embodiments, the dispersion of and flocculation by the anionic polymer flocculent at S104 may be carried out by an in-line mixer, details of which are provided below with reference to FIG. 3.

As the anionic polymer flocculant is being continuously stirred and therefore being more evenly dispersed into the MFT, flocs having an average size in the range of about 100 to about 10,000 μm may form. The average floc size can be measured by any conventional technique known in the art, for example, by process video microscope (PVM) or focused beam reflectance measurement (FBRM). In some embodiments, flocs having an average size of about 100 to about 500 μm may form.

The flocs may contain fines being bridged by the anionic polymer flocculant. As well understood by a person skilled in the art, the term "bridge", "bridged" or "bridging" is used to describe the adsorption of a polymer chain (i.e. polymer flocculent) onto several fine particles simultaneously, forming molecular linkages between the adjoining fine particles in the resulting floc (i.e. aggregation of the fine particles). It is generally understood that the higher the molecular weight of a polymer, the more highly branched the polymer structure can be, which can give more locations for particle absorption. Therefore, a direct correlation between molecular weight and the strength of the polymer as a flocculant (i.e. higher molecular weight, stronger flocculant and larger and stronger flocs) is expected. Moreover, the charges carried by a polymer may cause the polymer to elongate due to charge repulsion along the polymer chain, further allowing more locations for particle absorption. Depending on the charge density (as measured by % mole charge) carried by the polymer flocculant and the distribution of the surface charges on the fine particles to be flocculated, bridging may be achieved via hydrogen bonding (e.g. flocculating negatively charged particles with anionic polymers), charge neutralization (e.g. flocculating particles carrying negative charged surface sites with cationic polymers having complementary positive charge distribution), electrostatic attraction (e.g. flocculating low charge density particles with high charge density polymers), or any other flocculating mechanisms known to a skilled person in the art.

At S106, a cationic polymer flocculant may be dispersed in the first mixture to form a second mixture comprising floc aggregates and the floc aggregates are allowed to form.

In selected embodiments, the cationic polymer flocculant may have a molecular weight of at least 5,000,000 Da and may be selected to further flocculate the flocs to form floc aggregates comprising flocs bridged by the cationic polymer flocculant and having an average aggregate size in the range of about 100 to about 10,000 μm. As will be understood after reviewing the disclosure herein, the average sizes of floc aggregates may be similar to or larger than the average sizes of the initial flocs but the aggregated flocs would be more stable and have a more stable size, as compared to the initial flocs if they were not further bridged and stabilized with the suitable cationic polymer.

A suitable cationic polymer may have a molecular weight greater than about 5,000,000 Da and a cationic mole charge in the range of about 30 to about 70%.

Suitable cationic polymer flocculants may be a cationic polyacrylamide (AcAm), polydimethylaminoethylacrylate methyl chloride (DMAEA.MCQ), polydimethylaminoethylmethacrylate methyl chloride (DMAEM.MCQ), polydimethylaminoethylmethacrylate methyl sulfate (DMAEM.MSQ), polydimethylaminoethylacrylate methyl sulfate (DMAEA.MSQ), polydimethylaminoethylmethacrylate benzyl chloride (DMAEM.BCQ), polydimethylaminoethylacrylate benzyl chloride (DMAEA.BCQ), polytrimethylammonium propyl methacrylamide chloride(MAPTAC), polyacrylamidopropyltrimethylammonium chloride (APTAC), AcAm-DMAEA.MCQ copolymer, AcAm-DMAEM.MCQ copolymer, AcAm-DMAEM.MSQ copolymer, AcAm-DMAEA.MSQ copolymer, AcAm-DMAEM.BCQ copolymer, AcAm-DMAEA.BCQ copolymer, AcAm-MAPTAC copolymer, or AcAm-APTAC copolymer, and has a cationic mole charge of about 30% to about 70%. In some embodiments, a suitable cationic polymer flocculants may be an AcAm-DMAEA.MCQ copolymer, AcAm-DMAEM.MCQ copolymer, AcAm-DMAEM.MSQ copolymer, AcAm-DMAEA.MSQ copolymer, AcAm-DMAEM.BCQ copolymer, AcAm-DMAEA.BCQ copolymer, AcAm-MAPTAC copolymer, or AcAm-APTAC copolymer, with 30 mole % to 70 mole % of AcAm in each copolymer.

For example, a suitable cationic polymer flocculant may be a 50% mole charge AcAm-DMAEA.MCQ copolymer (RSV: 16-26 dL/g; IV: 7-15 dl/g: MW>5,000,000 Da), or a 50% mole charge AcAm-DMAEA.MCQ copolymer (RSV: 12.3-13.9 dL/g; IV: 7.6 dL/g; MW>5,000,000 Da). In some embodiments, a 50% mole charge linear AcAm-DMAEA.MCQ copolymer (RSV: 7-14 dL/g; MW>5,000,000 Da), 50% mole charge branched AcAm-DMAEA.MCQ copolymer (RSV: 10-13 dL/g; MW>5,000,000 Da), 65% mole charge branched AcAm-DMAEA.MCQ copolymer (RSV: 3-10 dL/g; MW>5,000,000 Da), 65% mole charge linear AcAm-DMAEA.MCQ copolymer (RSV: 14-24 dL/g; MW>5,000,000 Da), or 70% mole charge linear AcAm-DMAEA.MCQ copolymer (RSV: 10.6 dL/g; IV: 7.8 dL/g; MW>5,000,000 Da) may be used. Suitable cationic polymers are commercially available, for example, from Nalco (an Ecolab Company), Ciba, Cytec, SNF, or BASF.

Like the anionic polymer flocculant, the cationic polymer flocculant may be dispersed in the first mixture in its original form, e.g. as dry solids, or as emulsions such as latex emulsions, or as aqueous solutions or suspensions. In some embodiments, the cationic polymer flocculant may be dispersed as an aqueous solution. In a specific embodiment, the cationic polymer flocculant may be dispersed as a 0.20 wt % solution in water (on a polymer actives basis).

The cationic polymer flocculant may be dispersed in the first mixture using any methods known to those skilled in the art. In some embodiments, the cationic polymer flocculant may be dispersed in the first mixture from a feeder such as a polymer dosing unit, described below with reference to FIG. 3, followed by stirring.

In some embodiments, the dispersion of and flocculation by the cationic polymer flocculant at S104 may be carried out by an in-line mixer, details of which are provided below with reference to FIG. 3.

As the cationic polymer flocculant is being continuously stirred and therefore being more evenly dispersed into the first mixture, floc aggregates having an average size in the range of about 100 to about 10,000 μm may form, based on PVM or FBRM measurements. In selected embodiments, floc aggregates having an average size of about 200 to about 3,000 μm may form. In a specific embodiment, floc aggregates may have an average size of about 200 to about 1,000 μm.

In various embodiments, the cationic polymer flocculent may be dispersed into the first mixture either right before or after the completion of floc formation in S104, as indicated by visually observing that the size of the flocs has been stabilized. In some embodiments, it may be beneficial that the cationic polymer flocculant may be dispersed in the first mixture right before the formation of the flocs completes, as this may minimize the processing time while maximizing throughput (i.e, tons of MFT processed in a given time frame).

The cationic polymer flocculant and the first mixture may be stirred to allow uniform dispersion of the cationic polymer flocculant into the first mixture to form the floc aggregates. The stirring may continue until the size distribution of the floc aggregates stabilizes, the floc aggregates are of fairly uniform size and trapped water is released.

The technique of stirring at S102 and S104 is within the knowledge of those skilled in the art. A mixer such as a three-blade propeller mixer, a pitched blade propeller or the like may be used. A skilled person would readily appreciate that in order to prevent breaking down of the flocs or floc aggregates, it is desirable to use a low-shear mixing speed for a short period of time. The mixing speed and duration may be adjusted based on the size of the flocs or floc aggregates desired, and such adjustments are well within the knowledge of a skilled person. In selected embodiments, the anionic polymer flocculant may be mixed with the MFT for 60 seconds using a three-blade propeller mixer driven at 200 rpm by an overhead motor, and the cationic polymer flocculant may be mixed with the first mixture for 45 seconds using the same mixer at the same speed. In other selected embodiments, the anionic polymer flocculant may be mixed with the MFT for 60 seconds using a pitched blade propeller at 250 rpm, and the cationic polymer flocculant may be mixed with the first mixture for 45 seconds at 100 rpm using the same propeller. In other selected embodiments, at lease one in-line mixer may be used.

In various embodiments, optimal dosages and combinations of the anionic and cationic polymer flocculants may be determined by visually examining the flocs and the floc aggregates formed and the clarity of the water after S106: under dosing may result in insufficient flocculation while overdosing may result in sticky flocs or floc aggregates and foamy water. In some embodiments, optimal dosages and combinations of the polymer flocculants may also be determined by conventional jar testing methods.

In selected embodiments, the anionic polymer flocculant may be dispersed in the MFT at a dosage ranging from about 1 to about 1.5 kg polymer per dry ton solids (kg/DT) and the cationic polymer flocculant may be dispersed in the first mixture at a dosage ranging from about 0.1 to about to 1 kg/DT solids. In other selected embodiments, the dosage of the anionic and cationic polymer flocculants may be about 1 to about 2 kg/DT solids. For example, in a specific embodiment, the anionic polymer flocculant may be an AcAm/NaAc copolymer (about 30% anionic mole charge; RSV=41-50 dL/G; IV=31.7 dL/g; MW>5,000,000 Da) and dispersed at a dosage of 1.6 kg/DT solids, and the cationic polymer flocculant may be AcAm/DMAEA.MCQ copolymer (50% cationic mole charge; RSV: 16-26 dL/g; IV: 14.8 dL/g; MW>5,000,000 Da) and dispersed at a dosage of 1.2 kg/DT solids.

It is believed that embodiments using the dual-flocculant system disclosed herein may build floc aggregates which may withstand the pressure of compression at S110 (discussed below) than would be possible with a single flocculant system or with an anionic flocculant—cationic coagulant system. Without being limited to any particular theory, it is hypothesized that the flocs formed with the anionic polymer flocculant added can be further strengthened by the bridging from the high molecular weight cationic polymer flocculant. Two possible mechanisms may be at work.

Particles of fines typically carry both positive and negative charges on their surfaces, thereby forming lattices between positively charged and negatively charged surfaces with water being trapped in the interstitial spaces of the lattices.

According to one possible mechanism, the anionic polymer flocculant breaks the lattices by being absorbed onto the fine particles in loop and tail conformations, with the loops and tails extending into the aqueous solution. As well understood in the art, segments of the adsorbed polymer are considered to belong one of three sequences: loops, tails and trains. Trains typically consist of groups of adjacent segments that are actually attached to the surfaces of the fine particles. Tails are typically the segments at the ends of the polymer that are not directly attached to the surfaces of the fine particles and extend out into the aqueous solution. Loops are typically intermediate sequences of segments, between trains and also extend into the aqueous solution. Bridging flocculation is generally favored by extended loops and tails.

Due to the extended loop and tail conformation, not all negatively charged groups on the anionic polymer flocculent are neutralized by the positive charges on the fine particles. Some of the remaining negatively charged groups on the anionic polymer flocculant are available to bind to the extended chain of the cationic polymer flocculant. Thus, the cationic polymer chain can act as a nucleus for the fines bridged by the anionic polymer (i.e. flocs), forming larger and stronger floc aggregates. In this process, trapped water is released.

According to another possible mechanism, the cationic polymer flocculant attaches to the negatively charged surfaces on the fine particles and neutralizes them. These negatively charged surfaces on the fine particles are then no longer available for binding with the positively charged surfaces on the fine particles. Thus, the lattices collapse and water is released.

It is hypothesized for either of the above two possible mechanism, a high molecular weight cationic polymer flocculant would work more effectively than a low molecular weight cationic polymer such as a cationic coagulant. With more binding sites, the former allows more extensive flocculation of the flocs, forming larger and stronger floc aggregates.

After dilution and flocculation, the second mixture comprising the floc aggregates may be compressed to remove water and form a cake having a water content less than 55% by weight at S110. The compressing may be carried out by any technique known in the art. For example, the compressing may be carried out by a filter press. In selected embodiments, the second mixture is passed through the filter press to compress the floc aggregates into the cake. Specifically, the second mixture is fed into a chamber formed between two filter plates in the filter press. The chamber is lined with filter cloth. During compression by the two filter plates, water, as filtrate, is forced through the filter cloth while the cake is left in the chamber. The cake is then released from the chamber.

A typical fitter press generally has a plate-and-frame structure and includes a stack of filter plates movably attached to a frame. Each pair of filter plates defines a chamber lined with filter cloth, into which the second mixture is fed to be compressed. The filter press can be a pneumatic filter press and/or a hydraulic filter press. The filter press may be commercially available, for example, from Técnicas Hidráulicas (TH) Minerals, e.g. TH Minerals APN-5 Filter Press. Filter presses are also described in EP 0 701 852 to Portet Fortuny, incorporated by reference in their entirety herein. A skilled person would readily appreciate that many different known filter presses may be adapted for use with the embodiments described herein.

Figure 2A:
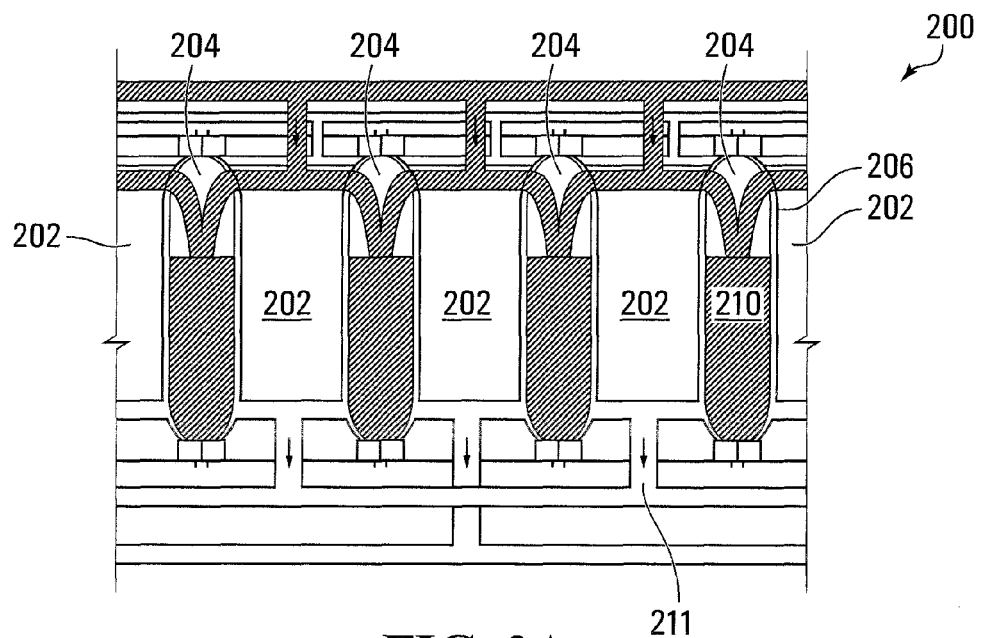
FIGS. 2A, 2B, and 2C are exploded views showing compression by a filter press.
Figure 2B:
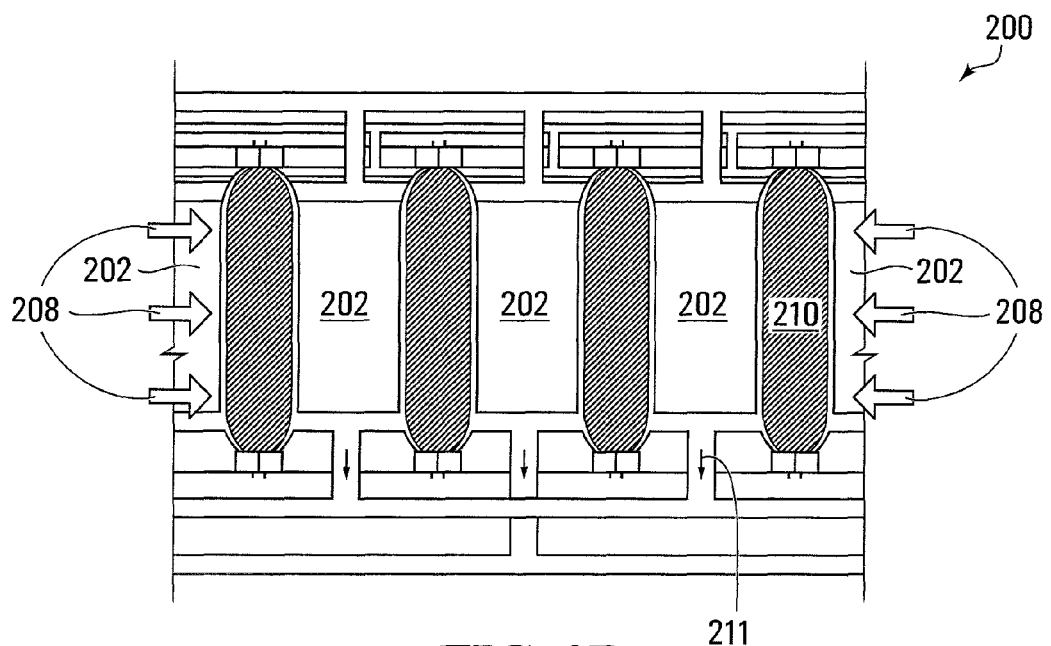
Figure 2C:
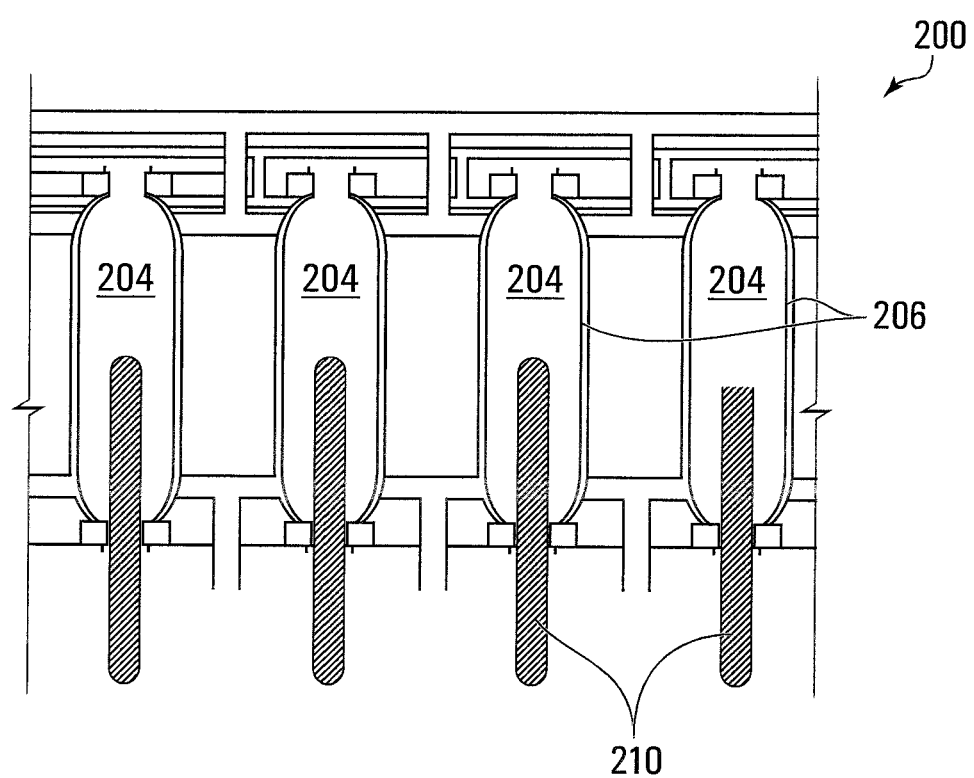

FIGS. 2A, 2B, and 2C show three different stages of compressing S110 according to an embodiment. A block of five adjacent filter plates 202 of a filter press 200 are shown in each of FIGS. 2A, 2B, and 2C. The filter plates 202 define chambers 204. Each of the chambers is lined with filter cloth 206. FIG. 2A shows that the second mixture is being fed into each chamber 204, for example, via a pump (not shown). As the chambers 204 are being filled up, the floc aggregates of the second mixture coat the filter cloth 206, thereby starting to form cakes 210 in each chamber, while the filtrate 211 is being forced out of the filter cloth 206, as indicated by the downward arrows, under the pressure of the incoming second mixture. When the chamber 204 is filled, the pressure of the chamber increases until a pre-determined point, for example, about 10 bar. At this pressure, further filling of the chamber occurs only when a volume of the filtrate 211 is forced out of the filter cloth 206. FIG. 2B shows the floc aggregates are being compressed in the chambers 204 to form cakes 210. Hydraulic cylinders 208 (shown by the hollow arrows) close the filter plates 202, thereby squeezing further filtrate 211 out of the cakes 210 at high pressure, for example up to 16 bar. FIG. 2C shows that cakes 210 are being released from the chambers 204 under gravity.

Alternatively, instead of using a specified squeezing time, a sensor may be attached to the filter press to detect the degree of the dryness of the cakes Once a predetermined degree of dryness has been reached, the squeezing stops, the filter plates open and the cakes are released. As a further alternative, the squeezing may stop when it is visually observed that the filtrate collection rate drops to a trickle.

The resulting cakes 210 may contain less than 55% water by weight and have an average cake solids content of 49% by weight, measured using gravimetry. The filtrate 211 collected may contain less than 1% solids by weight. In a specific embodiment, the cakes may have a solids content of approximately 55 wt %. In another specific embodiment, the cakes may have a solids content of approximately 50-60 wt %. According to one specific embodiment, cakes having about 39% water by weight may be obtained. According to another embodiment, the cakes may have a water content of about 35 to about 52% by weight.

The solids content of the cake may be influenced by filter pressure, filter time and cake thickness. A cake containing a higher solids content may be obtained under conditions of high press pressure, small cake thickness and long press time. However, long press time may also decrease throughput of MFT (i.e. tons of MFT dewatered in a given time frame). Therefore, a compromise of high pressure, small cake thickness and low press time may be employed. In selected embodiments which employ filter press parameters of 10 bar pressure, 30 minutes press filtration time and 36 mm cake thickness, a throughput of 1.4 kg/m$^2$/hr of 30 wt % solids MFT (or 0.42 kg/m$^2$/hr of dry solids of MFT if water was removed from the MFT) may be achieved with an average cake solids content of 49 wt % solids. In other selected embodiments which employ filter press parameters of 8 bar pressure, 25 minutes press filtration time and 36 mm thickness, cakes with solids content of 50-60 wt % and a filtrate with the average total suspended solids (TSS) (measured by filtering through a 0.45 micron filter) below 688 ppm (low value of 64 ppm) may be obtained.

Optionally, after dilution and flocculation, the second mixture may be allowed to settle. The free water may be siphoned off and the solid beds comprising the floc aggregates may be pumped into the filter press. In selected embodiments, the solid beds may have a solids content of about 30 wt %. The siphoned water may be recycled back to dilute the MFT in S102 or to prepare aqueous flocculant solutions at S104 and S106.

As a further alternative, after dilution and flocculation, the unflocculated fines in the second mixture may be further coagulated using a suitable cationic coagulant at S108. The term "cationic coagulant" generally refers to a cationic polymer that has a lower molecular weight in the range of 25,000 to 1,000,000 Da.

In various embodiments, a cationic polymer having a low IV between about 0.08 to about 1.3 dL/g may be used. In selected embodiments, an epichlorohydrin dimethyl amine (EPI-DMA) polymer, which may be a cross-linked polymer or a diallyldimethylammonium chloride (DADMAC) polymer may be used. The IV of a suitable cross-linked EPI-DMA polymer may be 0.15-0.29 dL/g. The IV of a suitable EPI-DMA polymer may be 0.08-0.14 dL/g. The IV of a suitable DADMAC polymer may be 0.35-0.55 dL/g or 0.9-1.3 dL/g.

In selected embodiments, the cationic coagulant may be added at about 0.1 to about 1.5 kg/DT solids. In a specific embodiment, the cationic coagulant may be added to the second mixture at about 0.5 kg/DT solids.

It is generally understood that the coagulant enables removal of the electrostatic double-layer surrounding the charged fine particles, and sequestration and agglomeration of such particles into small coagulated clusters. The coagulant may thus enable capturing the unflocculated fines in the second mixture, thereby minimizing the amount of fines remaining in suspension in the second mixture.

Accordingly, after dilution, flocculation and compression, the dewatering processes described herein can conveniently produce cakes containing fines originally contained in the input MFT. The cakes obtained by the dewatering processes described herein may be capable of achieving over 5 kPa shear strength after about 14 days of cake consolidation. In selected embodiments where a cake has a solids content over 50 wt %, the cake may achieve shear strength over 5 kPa as soon as it leaves the filter press. Therefore, the requirements of Directive 074 may be met.

A system for the dewatering processes described herein is illustrated with reference to FIG. 3. The system 300 comprises a source 302 of oil sands fine tailings mixed with sufficient water; a source 305 of an anionic polymer flocculant; a source 307 of a cationic polymer flocculant; at least a mixer 304 connected to sources 305 and 307 for mixing the anionic polymer flocculant and for mixing the cationic polymer flocculant; and a filter press 310.

Figure 3:
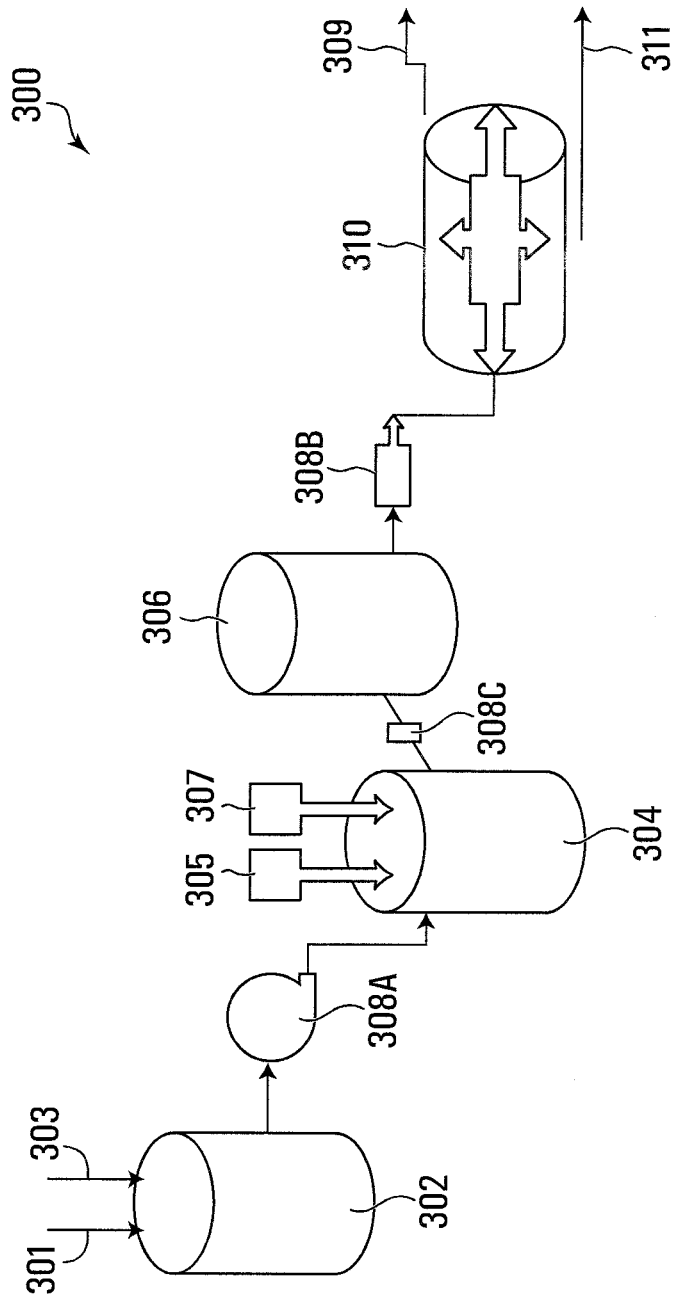
FIG. 3 is a schematic diagram of a system for the dewatering process of FIG. 1 according to an embodiment.

As illustrated in FIG. 3, at source 302 where S102 may be carried out, the MFT 301 is diluted by water 303. In various embodiments, the source 302 may be a container, for example, a holding tank, which is configured to facilitate the dilution of the MFT 301 by water 303. The source 302 may be equipped with a stirrer (not shown), for example, a three-blade propeller, for effective dilution. In selected embodiments, the source 302 may be a mixing vessel, for example, a commercially available cement/concrete mixer or other relatively low shear mixing vessel.

The anionic polymer flocculant and the cationic polymer flocculant may be respectively provided by sources 305 and 307. Each of sources 305 and 307 may include a polymer dosing unit such as a mini-polymer feeder manufactured by Nalco, an Ecolab Company, or a polyblend system supplied by US Filter, for controlling the amount of the flocculants to be dispensed. Many commercially available polymer dosing units may be readily adapted for the dewatering processes described herein. In some selected embodiments, the polymer dosing unit such as PARETO™ Mixing Technology from Nalco, an Ecolab Company, which is described in a PARETO™ Mixing Technology brochure (http://www.nalco.com/documents/Brochures/B-1259.pdf), U.S. Pat. No. 7,550,060 and U.S. Pat. No. 7,785,442, the entire contents of all of which are incorporated herein by reference, may be adapted for the dewatering processes described herein. It may be beneficial to employ the PARETO™ Mixing Technology, as such use may result in an optimal dosing and injection of the flocculants at S104 and S106 and more uniform flocculant dispersion into the oil sands fine tailings at S104 or into the first mixture at S106 in a shorter time, compared to traditional polymer dosing units. Therefore, in cases where the polymer flocculants need to be first diluted with water before being dispersed at S104 and/or S106, more water savings and energy savings may be achieved when the PARETO™ Mixing Technology is used to replace traditional polymer dosing units.

In selected embodiments, after S102, the MFT may be transferred to a mixer 304. At S104, an anionic polymer flocculant may be dispersed from source 305 into the MFT to form a first mixture comprising flocs in the mixer 304. A cationic polymer flocculent may be subsequently dispersed from source 307 into the first mixture to form a second mixture comprising floc aggregates in the mixer 304 at S106.

The mixer 304 may comprise a tank, which may be further equipped with a low shear mixer, such as a low shear three-blade propeller mixer.

Alternatively, the mixer may comprise an in-line mixer, which is connected to the polymer flocculant sources 305 and 307. A suitable in-line mixer may be any commercially available in-line mixer. In some embodiments, a FLOCMASTER™ in-line mixer manufactured by J. F. Knauer GmbH may be readily adapted for the dewatering process described herein. The basic structures and operation principles of some suitable in-line mixer are described in U.S. Pat. No. 5,993,670 to Knauer, issued Nov. 30, 1999, the entire contents of which are incorporated herein by reference. Briefly, such an in-line mixer has an inlet for receiving flocculants. Such an in-line mixer is also provided with a rotatable distribution head to be disposed in the fluid path, which has mixing blades (impellers) and distributed flocculant outlets in fluid communication with the inlet. A variable speed rotator for rotating the distribution head is also provided.

In some embodiments, it may be beneficial to use such in-line mixers, as these in-line mixers have rotating impellers to be disposed in the fluid path for mixing the fluid and distributed flocculant outlets (slots) are provided on the impellers such that polymer flocculants can be conveniently injected into the fluid path through these outlet slots. Such in-line mixers can provide short but intense mixing, which can result in improved dispersion of polymer flocculants into the MFT and more effective flocculation of the fines, as compared with other mixers such as static mixers. It is also noted that such in-line mixers can cause high shear near the rotating impellers, which means that the high shear occurs shortly before or during flocculation (at S104 and S106), not after flocculation. Therefore, the integrity of the flocs or floc aggregates formed after passing through the rotating impellers may be retained. With the use of such in-line mixers, water usage may be reduced.

In selected embodiments, the anionic polymer flocculant from source 305 may be injected through a first in-line mixer and the cationic polymer flocculant from source 307 may be injected through a second in-line mixer placed downstream of the first in-line mixer. Each of the first and second in-line mixers maybe a FLOCMASTER™ in-line mixer.

Briefly, in a system for dewatering oil sands fine tailings, a conduit comprising a first end and a second end is provided for a slurry comprising water and oil sands fine tailings to flow from the first end to the second end. A first inline mixer is coupled to the conduit and a second inline mixer is coupled to the conduit downstream of the first inline mixer. A source of the anionic flocculant is connected to the inlet of the first inline mixer. A source of the cationic flocculant is connected to the inlet of the second inline mixer. A filter press is also provided for compressing the formed floc aggregates to remove water and form a dewatered compact. During operation, a stream of the slurry is flown through the conduit from the first end to the second end. The anionic polymer is injected into the stream through the first inline mixer, and the cationic polymer is injected into the stream through the second inline mixer. The output from the second end contains flocs aggregates, which are compressed using the filter press to remove water and form a dewatered compact.

An embodiment wherein such in-line mixers are used is described in the Examples below, and further details of the in-line mixers and their operations are also discussed therein.

Alternatively, the polymer flocculant sources and the mixer may be provided within the same processing unit, such as a FLOCTAINER™ dewatering system manufactured by J. F. Knauer GmbH. It may be beneficial to use such a system as it allows preparation of polymer flocculant solution, dosing and mixing in the same processing unit or station. Further, it is possible to use either powder or liquid polymer flocculants with such a system.

The filter press 310 is configured for compressing the floc aggregates to remove filtrate 311 while forming cake 309. As can be understood, the cake is a dewatered compact formed from the compacted floc aggregates. The filter press may be of any known configuration in the art. For example, the filter press may comprise a frame and a plurality of filter plates being movably attached to the frame. The plurality of filter plates is configured to form a multiplicity of chambers with each chamber being defined by two adjacent filter plates and being lined by filter cloth. When the floc aggregates are being compressed in the chamber of the filter press, filtration, mainly water, is forced out of the filter cloth while the cake is formed in the chamber. The cake is then subsequently released from the filter press.

In selected embodiments, a buffer tank 306 may be employed. The buffer tank 306 may be in fluid communication with the mixer 304 and with the filter press 310. After S106, the second mixture is transferred to the buffer tank 306 where it is mixed with a cationic coagulant to capture the fine particles still remaining in suspension. After free water settles out of the second mixture, the free water is pumped back into the process to either prepare flocculent solutions at S104 and S106, or to dilute the MFT at S102. The remaining contents of the second mixture are then transferred to the filter press 310 to be compressed into the cake.

As illustrated in FIG. 3, the MFT source 302 may be in fluid communication with the mixer 304. For example, a pump 308A may be used to pump the MFT into 304. The mixer 304 may be in fluid communication with the filter press 310, for example, via pump 308B. Where the buffer tank 306 is employed, it may be in fluid communication with the mixer 304, for example, via pump 308C, and in fluid communication with the filter press 310, for example, via pump 308B. Pumps 308A and 308B may be any pump which can adequately move the MFT or the second mixture. Pump 308C may be a positive displacement pump to avoid destruction of the floc aggregates during transfer.

In selected embodiments, a programmable logic controller (PLC, not shown in FIG. 3) may be employed in the dewatering system described herein to automate the dewatering process. For example, a PLC may be employed to carry out the dilution of the MFT at S102, the transfer of the MFT from the MFT source 302 to the mixer 304, the transfer of the second mixture from the mixer 304 to the optional buffer tank 306 or to the filter press 310. The PLC may also be employed to allow release of the materials from sources 302, 305 and 307 at pre-determined intervals. Any commercially available PLCs may be readily adapted to automate the dewatering processes described herein.

In selected embodiments, it is expected that the compact produced from a process as described herein can exhibit a shear strength of 5 kPa or higher and a solids content of about 47 wt % or higher.

Embodiments of the present invention are further illustrated with the following examples, which are not intended to be limiting.

EXAMPLES

The materials used in these examples were obtained as follows unless otherwise specified in an example.

The neat MFT used in the examples were obtained from Syncrude and typically contained about 35 to about 37 wt % solids with $d_{50}$ being about 6 μm, and about 1 wt % bitumen in water. Unless specified otherwise, the anionic and cationic flocculants and the cationic coagulants tested were prepared by Nalco, an Ecolab Company.

Example 1

Small Scale Laboratory Tests

In general, a slurry of 100 mL of MFT (37 wt % solids) was diluted with 100 mL pond water in a 500 mL plastic cylinder and mixed well to obtain an approximately 19 wt % solids slurry. An anionic flocculant was added to the slurry as 0.15 wt % solution in water (on polymer actives basis). The cylinder was capped and inverted five times by hand to mix. A cationic flocculant was added to the cylinder as a 0.2 wt % solution in water (on polymer actives basis) and the mixing procedure was repeated. The resulting slurry was examined for floc formation and water clarity. The flocculant combinations that showed promise were selected for dosage optimization. If stable flocs were formed, the flocs were pressed using a laboratory pneumatic filter press to determine ease of pressing. The flocs were pressed at 80 psi for between 20 minutes to 1 hour and the dryness of the filter cake was measured by gravimetry (Mettler Toledo™ 53 Halogen Moisture Analyzer).

In additional laboratory tests, the flocculants were mixed into a MFT slurry volume containing approximately 18% solids, by injecting first the anionic polymer flocculant and mixing for 60 seconds using a 3-blade propeller mixer driven at 200 rpm by an overhead motor, followed by injection of the cationic polymer flocculant and mixing for 45 seconds at the same speed. The floc size, stability and water clarity were visually examined after stirring was stopped and the polymer dosages were optimized on the basis of these parameters.

Example 2

Intermediate Scale Tests

Generally, approximately 7.5 L each of MFT containing 36% solids and pond water slurry was mixed in a 5 gallon container to get an approximately 18 wt % solids slurry. An anionic polymer flocculant was added and mixed with the slurry using a three blade propeller mixer at 200 rpm until a thick lumpy first mixture was formed. This was followed by the addition of a cationic polymer flocculant, which was mixed at 200 rpm until discreet floc aggregates were formed and clear water was released. The total flocculant dosage being between 1-2 kg/DT solids: 1 kg/DT for the anionic polymer flocculant and 0.5 kg/DT for the cationic polymer flocculant. The free water was decanted after gravity settling to obtain an approximately 30 wt % solids flocculated suspension. This suspension was transferred into a hopper and driven by pneumatic pressure (8 bar) into a 0.5 m×0.5 m×36 mm chamber bounded by two filter cloth-lined filter plates. Filtration was continued until the filtrate collection rate dropped to a trickle. The pressure was then released and the chamber was opened to remove the cake. The solids content in the cake was measured using gravimetry and found to be approximately 55 wt %. The TSS in the filtrate was measured by filtering through a 0.45 micron filter and found to be below 1000 mg/L.

Example 3

Large Scale Tests

In general, 12.5 L of MFT with a solids content of 36% was diluted with 12.5 L of pond water to form an approximately 18 wt % slurry. The slurry was fed into a 30 L flocculation tank via displacement from another tank upstream of the flocculation tank. An anionic polymer flocculant solution (0.15 wt % on polymer actives basis) was mixed into the slurry using a pitched blade propeller or a drill mixer for about 60 seconds at 250 rpm. Free water was released and large flocs have a floc size in the range of 100-10,000 mm were observed to have been formed. A cationic polymer flocculant solution (0.21 wt % on polymer actives basis) was added to a first mixture comprising the flocs and mixed with the pitched blade propeller or a drill mixer for about 45 seconds at about 100 rpm. Floc aggregates larger than the flocs were observed to have been formed. A second mixture comprising the floc aggregates was transferred to a tank via a peristaltic pump, where a cationic coagulant (0.2 kg/DT) was added to reform any floc aggregates broken in the transfer from the flocculation tank to the holding tank and to capture the fines still remaining in suspension. The resulting mixing was press filtered using an APN-5 filter press at 10 bar for 30 minutes.

Example 4

Study of Filtration Performance

The study was carried out using the general experimental procedures of Example 3.

TABLE 1 shows the results of filtering MFT at different conditions of pressure, cake thickness and time. A higher value of cake solids from the press was obtained under conditions of high pressure, small cake thickness and long press time. However, long press time also decreased throughput; therefore, a compromise was to use high pressure, small cake thickness and low press time. The filtrate quality changed over the filtration cycle, being high in solids in the beginning before the cake was formed and improving as filtration proceeded through the cake. Where measured, the average total suspended solids (TSS) over the cycle are shown in TABLE 1. The shear strength was measured an Edeco Pilcon hand held Vane Serial # DR5801 model 19.01.00 obtained from English Drilling Equipment.

TABLE 1

Properties of Sample Cakes

| Press Time (min) | Press Pressure (bar) | Cake Thickness (mm) | Cake Solids (wt %) | Shear Strength at 14 days (kPa) | 30% solids MFT Throughput (kg/min) | Average TSS (wt %) |
|---|---|---|---|---|---|---|
| 30 | 7  | 36 | 47.5 | 5.0  | 1.12 | — |
| 30 | 10 | 36 | 50.6 | 9.8  | 1.30 | — |
| 50 | 7  | 36 | 51.9 | 8.8  | 0.82 | — |
| 50 | 10 | 36 | 50.6 | 11.0 | 0.79 | 1.7 |
| 30 | 7  | 48 | 47.7 | 3.8  | 1.34 | 1.2 |
| 50 | 7  | 48 | 48.1 | 5.0  | 0.83 | 0.3 |
| 50 | 10 | 48 | 51.9 | 5.8  | 0.94 | 0.3 |
| 30 | 10 | 48 | 49.4 | 4.8  | 1.46 | 0.9 |
| 40 | 10 | 48 | 49.0 | 5.0  | 1.13 | 1.0 |

Figure 4:
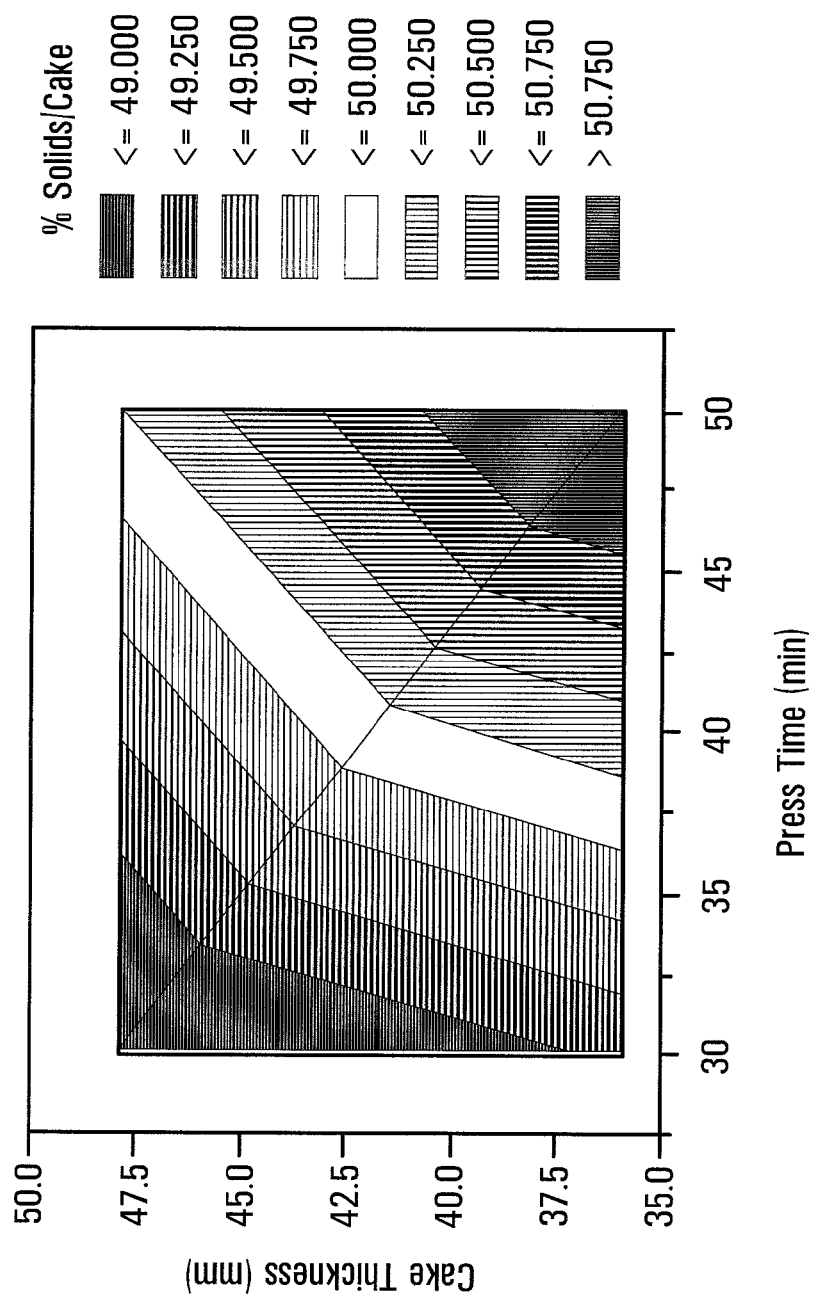
FIG. 4 is a data graph showing solids content of sample cakes obtained according to the dewatering process of FIG. 1 as a function of press time and cake thickness.

FIG. 4 illustrates the solids content of sample cakes obtained using an AcAm/NaAc copolymer followed by an AcAm/DMAEA.MCQ, followed by a branched Epi-DMA polymer followed by an AcAm/NaAc copolymer, as a function of press time and cake thickness.

Figure 5:
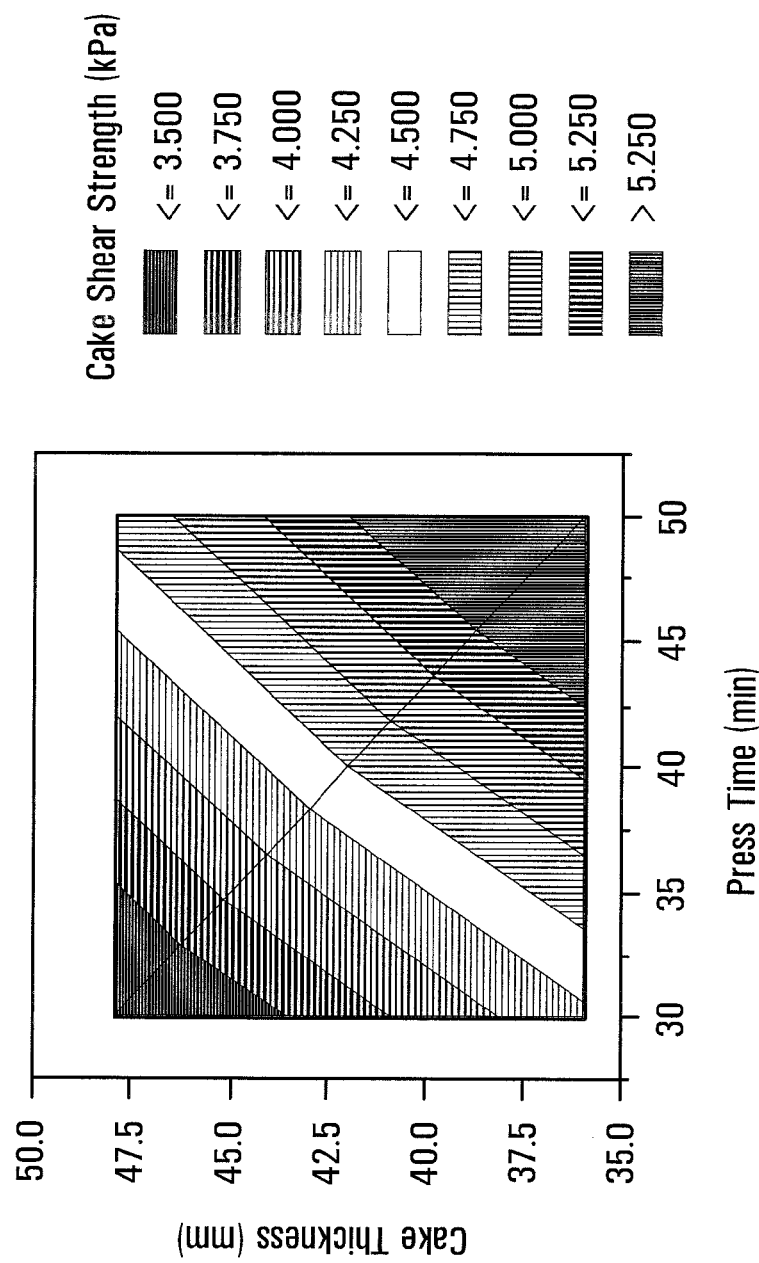
FIG. 5 is a data graph showing shear strength of the sample cakes of FIG. 4 as a function of press time and cake thickness.

FIG. 5 illustrates the shear strength of the sample cakes of FIG. 4 as a function of press time and cake thickness. The shear strength was measured in accordance to ASTM D2573. Specifically, the shear strength of the sample cakes, which were lightly packed into a 5 gallon pail, was taken at various times following cake formation using an Edeco Pilcon Vane Serial # DR5801 model 19.01.00 obtained from English Drilling Equipment. Due to the variability of shear strength within a sample cake, several measurements were taken and the results averaged.

FIGS. 4 and 5 suggest that for a throughput of 1.17 kg/min for 30% solids MFT, the optimum filter press conditions may be press pressure of 10 bar, cake thickness of 36 mm and press time of less than 30 minutes. The polymer dosage was determined to be 1-2 kg active polymer/ton of dry solids: 1 kg/DT for the anionic polymer flocculant and 0.5 kg/DT for the cationic polymer flocculant.

Example 5

Study of Shear Strength of Filter Cakes

Figure 6:
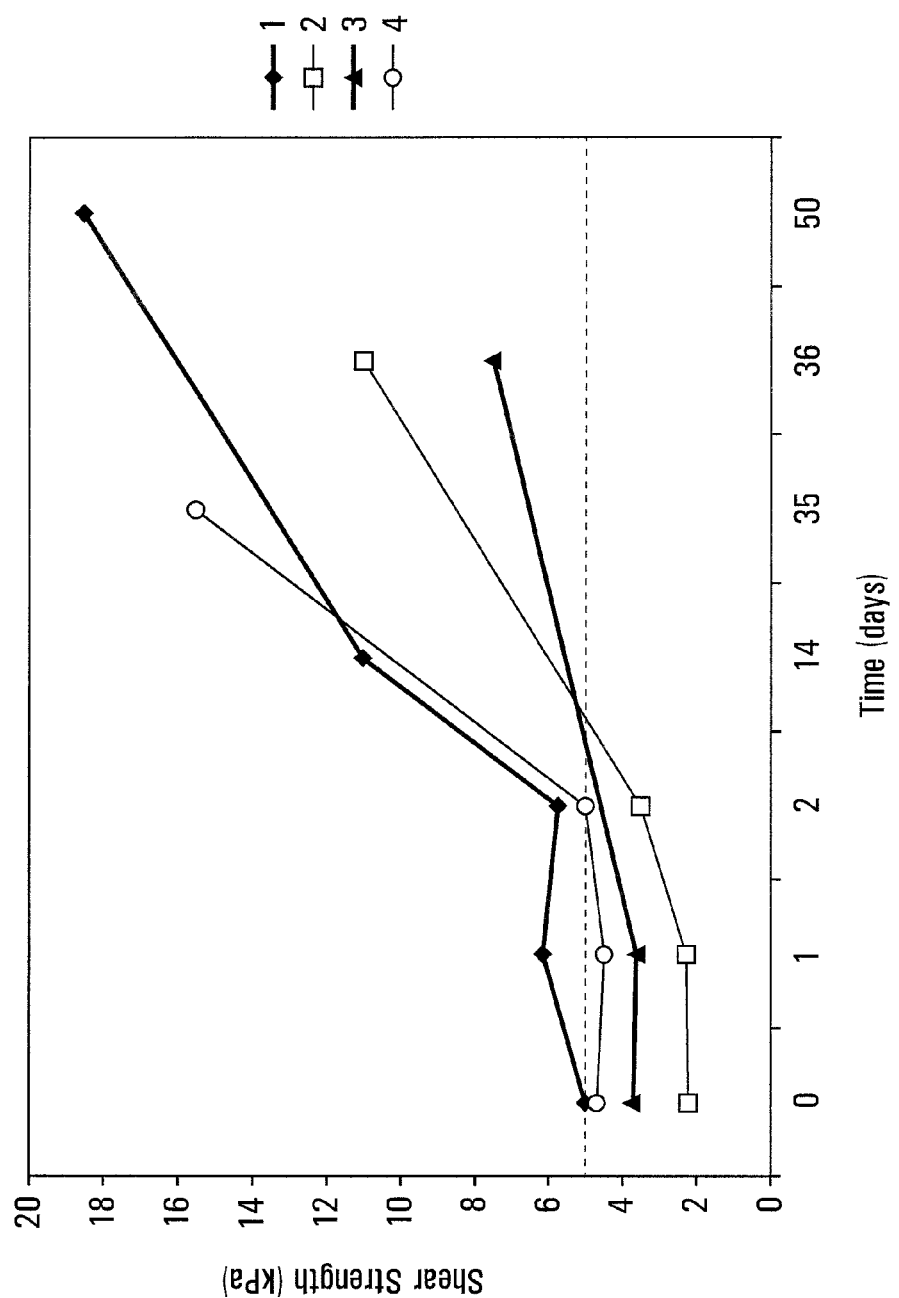
FIG. 6 is a data graph showing shear strength of the sample cakes of FIG. 4 following cake formation.

The shear strength of sample cakes obtained from Example 4 was measured at various times following cake formation. Results are illustrated in FIG. 6 for shear strength versus time with respect to cakes 1, 2, 3 and 4 which were obtained from four press cycles. Irrespective of the initial shear strength, sample filter cakes achieved over 5 kPa strength after 14 days. As a rule of thumb, a cake having a solids content of over 50 wt % can show a shear strength in excess of 5 kPa as soon as it leaves the filter press (t=0).

The sample cakes went through a freeze-thaw cycle: the cakes froze when the heat was turned off at night and the frozen cakes thawed when the heat was turned back on. This resulted in cakes having a higher consolidation and shear strength than those not having gone through the cycle.

Example 6

In this Example, a dual-flocculant system was used in accordance with the general experimental procedure of Example 1. 1.6 kg/ton solids of an AcAm—NaAc copolymer (having about 30% anionic mole charge; RSV: 41-50 dL/g; IV: 31.7 dL/g; MW>5,000,000 Da), referred to herein as anionic polymer flocculant A, were first mixed with the input slurry. Next, 1.2 kg/ton solids of a AcAm-DMAE-A.MCQ copolymer (having about 50% cationic mole charge; RSV: 16-26 dL/g; IV: 7-15 dL/g; MW>5,000,000 Da), referred to herein as cationic polymer flocculant B, were added to and mixed with the slurry.

In-situ floc stability was evaluated and correlated with the settling rate of the flocs and the supernatant clarity achieved with the system. Specifically, in-situ floc stability was monitored simultaneously by means of a Focused Beam Reflectance Measurement (FBRM) probe (G400 FBRM) and by a Process Video Microscope (PVM) from Mettler Toledo. These two probes were immersed in an MFT sample of 18% wt solids in a square jar in such a way that they monitored the floc size at a similar location relative to an agitator. The agitator was a 3-blade propeller that provided good polymer-slurry mixing at 400 rpm.

Figure 7:
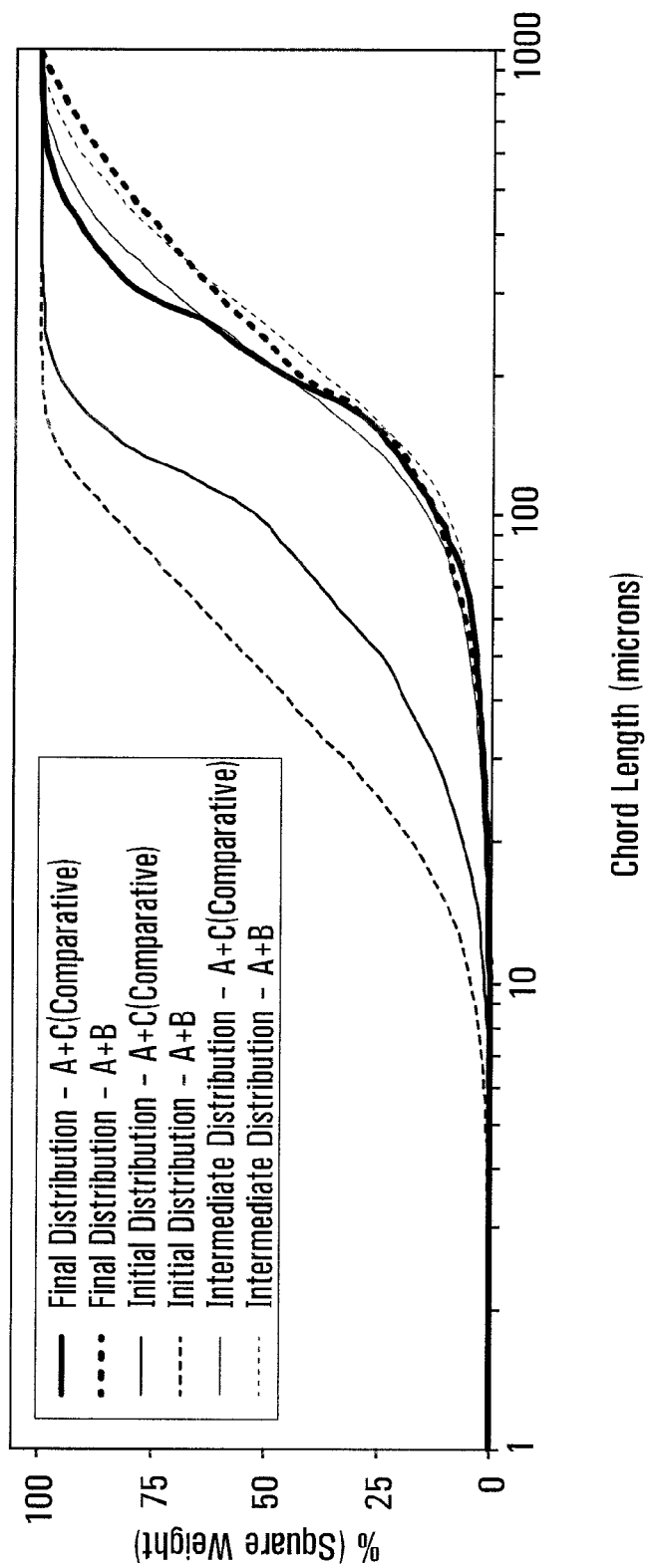
FIG. 7 is a line graph comparing in-situ floc stability between an exemplary process and a comparison process.
Figure 8:
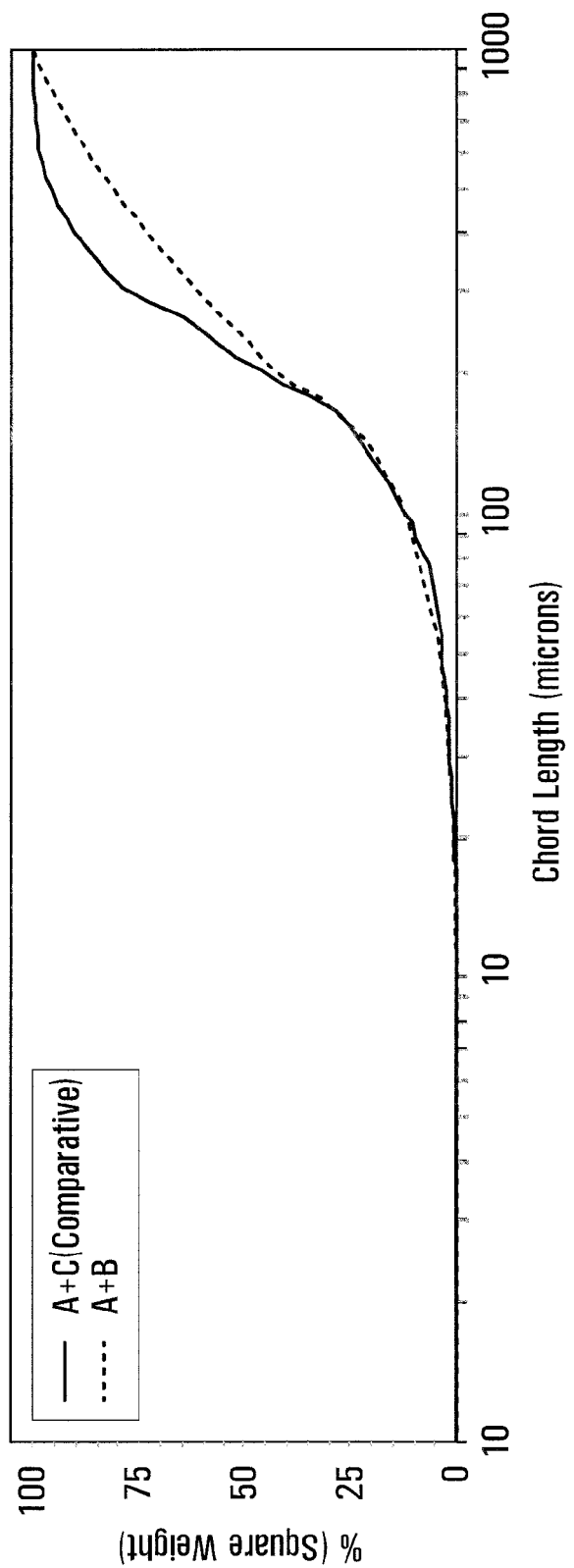
FIG. 8 is a line graph comparing sizes of sample floc aggregates obtained according to the processes of FIG. 7.

The FBRM measured the chord size of the flocs as they passed by the measurement window in the focal plane of the incident laser beam. Results the FBRM measurements by a G400 FBRM are illustrated in FIG. 7 and FIG. 8. The initial, intermediate and final cumulative chord size distributions for the dual-flocculant system were plotted in FIG. 7. The chord frequency was square-weighted by its size to accurately represent the larger size flocs that were created by the addition of the flocculants and was plotted as a percentage of the total. It can be seen that despite starting off with a smaller chord size distribution, the dual-flocculant system increased the chord size both at an intermediate time (3 minutes of stirring) and in the final state (8 minutes of stirring).

The final square weighted distribution of the chord sizes from the dual-flocculant system was plotted in FIG. 8. As can be seen from FIG. 8, there were more final floc aggregates in the size range of 200-1000 μm with the dual-flocculant system: 75% of the floc aggregates were below 400 μm.

Figure 9:
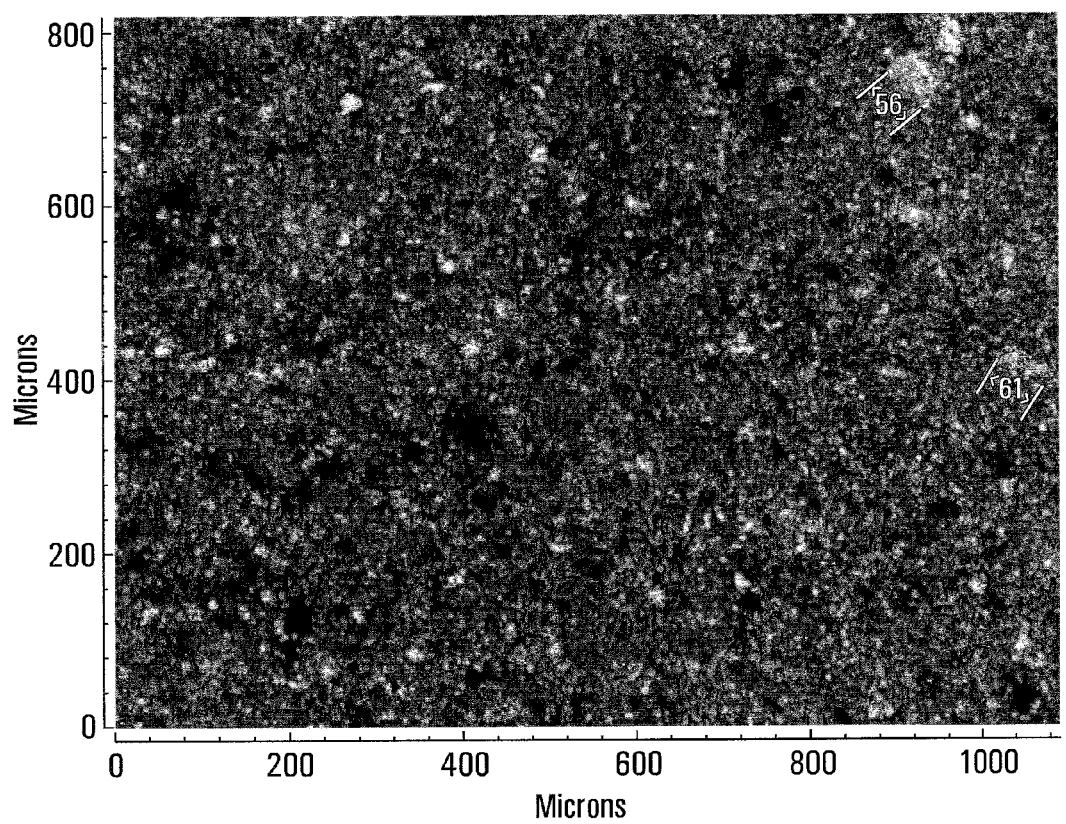
FIG. 9 is a Process Video Microscope (PVM) image of the un-flocculated mature fine tailings (MFT) used in the processes of FIG. 7.

The PVM provided in-situ magnified images of the flocs which showed their morphology and corroborated the FIRM results. FIG. 9 is a PVM image showing initial state of the un-flocculated MFT used (i.e. before any chemical addition), with the two axes showing the size of the measurement window. The bright spots were the clay particles in focus whereas the dark spots were bitumen particles present in the MFT. Two of the naturally aggregated clay particles were estimated to be 56 μm and 61 μm in maximum diameter as shown by the arrows. The background was seen as a continuous dark scale due to the high density of clay particles.

Figure 10A:
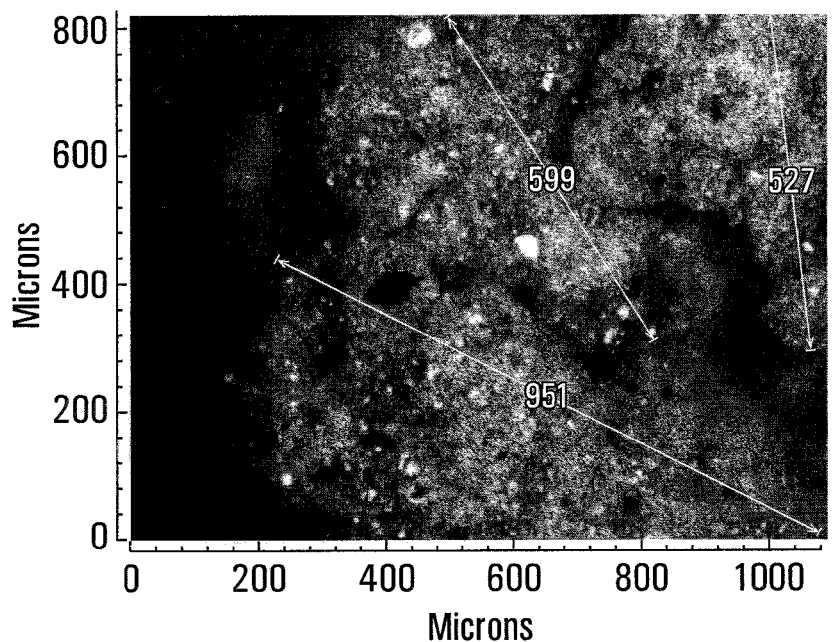
FIGS. 10A and 10B are PVM images showing the sample floc aggregates obtained according to the exemplary process of FIG. 7.
Figure 10B:
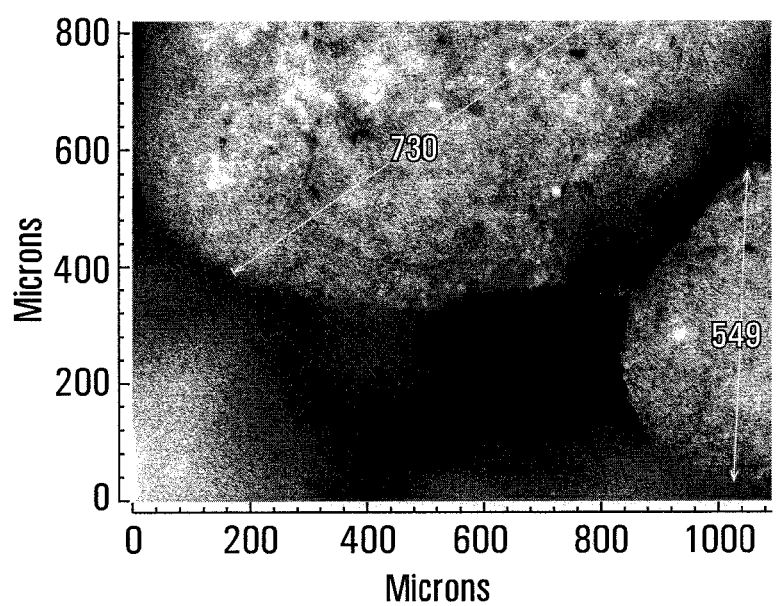

FIGS. 10A and 10B were photographic images showing the final state of the floc aggregates obtained by the dual-flocculant system. Large floc aggregates measuring between 500 to 950 μm were distinguished against the dark background which was free water released by the flocculation process, suggesting that the floc aggregates formed by the dual flocculant system were strong.

Figure 11:
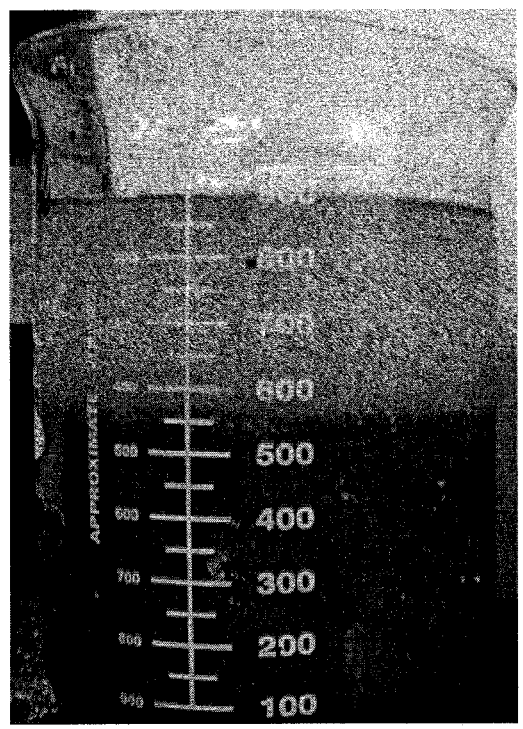
FIG. 11 is a photographic image showing the settled volume of the MFT after being treated with the exemplary process of FIG. 7.

The degree of solid settlement and the clarity of supernatant containing the floc aggregates obtained from the dual-flocculant system were measured 15 minutes after the completion of the experiment. FIG. 11 was a photographic image showing the settled volume of the MFT after being treated with the dual-flocculant system. As can be seen from FIG. 11, the floc aggregates settled into a compact layer and the supernatant appeared to be clear.

Example 7

Comparative

Instead of using the dual-flocculant system of Example 6, a flocculant-coagulant system was used following the experimental procedure of Example 6. Specifically, 1.6 kg/ton solids of anionic flocculant A was used and followed by 1.25 kg/ton solids of cationic coagulant C (cross-linked EPI-DMA polymer; IV: 0.15-0.29 dL/g).

As in Example 6, in-situ floc stability was evaluated and correlated with the settling rate of the flocs and the supernatant clarity achieved with the system. Same measuring FBRM and PVM instrument and same measurement procedures as in Example 6 were employed.

Results the FBRM measurements are illustrated in FIG. 7 and FIG. 8. The initial, intermediate and final cumulative chord size distributions for the flocculant-coagulant system were plotted in FIG. 7.

The final square weighted distribution of the chord sizes from the flocculant-coagulant system was plotted in FIG. 8. As can be seen from FIG. 8, 75% of the floc aggregates were below 300 μm.

FIGS. 10A and 10B were photographic images showing the final state of the floc aggregates obtained by the dual-flocculant system. Large floc aggregates measuring between 500 to 950 μm were distinguished against the dark background which was free water released by the flocculation process.

The degree of solid settlement and the clarity of supernatant containing the floc aggregates obtained from the dual-flocculant system were measured 15 minutes after the completion of the experiment. FIG. 11 was a photographic image showing the settled volume of the MFT after being treated with the dual-flocculant system. As can be seen from FIG. 11, the floc aggregates settled into a compact layer and the supernatant appeared to be clear.

Figure 12A:
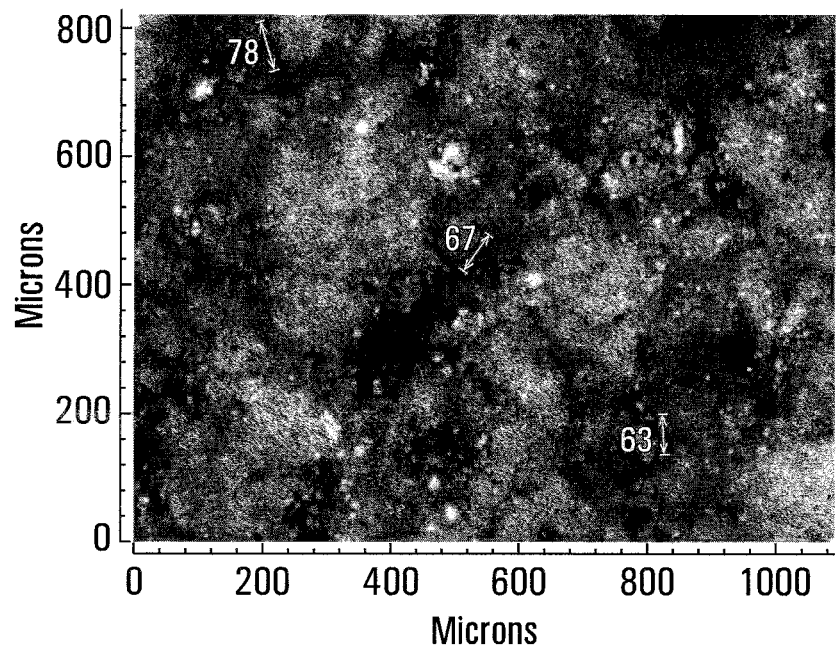
FIGS. 12A and 12B are PVM images showing the sample floc aggregates obtained according to the comparison process of FIG. 7.
Figure 12B:
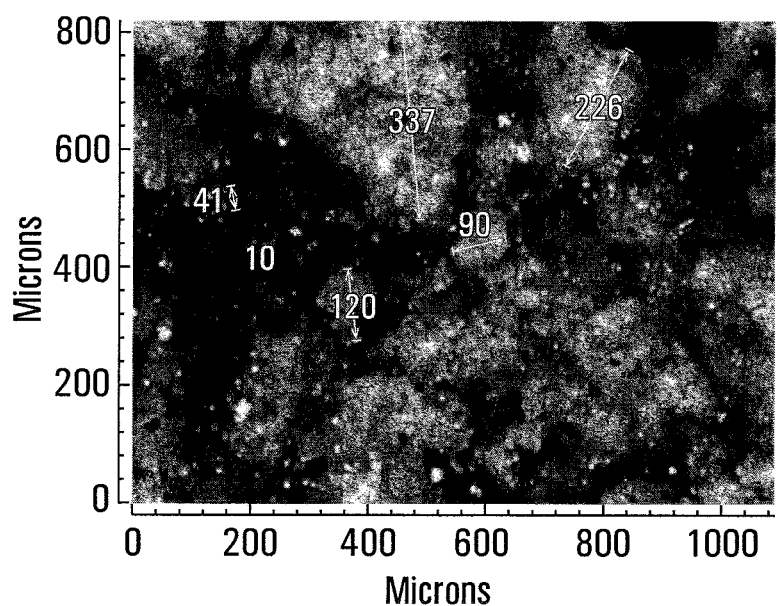

FIGS. 12A and 12B were photographic images showing the final state of the floc aggregates obtained by the flocculant-coagulant system. Many more small flocs in the less than 100 μm size range could be seen along with the larger flocs. In addition, there was no clear distinction between the floc aggregates and the free water, suggesting that the free water contained small particles that had been broken up by the continued agitation. Thus, the floc aggregates formed by the flocculant-coagulant system were not strong.

Figure 13:
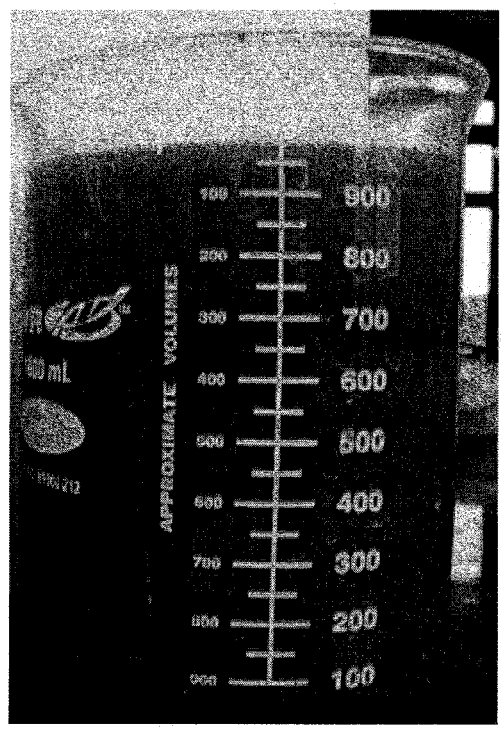
FIG. 13 is a photographic image showing the settled volume of the MET after being treated with the comparison process of FIG. 7.

The degree of floc settlement and the clarity of supernatant containing the floc aggregates obtained from the flocculant-coagulant system were measured 15 minutes after the completion of the experiment. FIG. 13 was a photographic image showing the settled volume of the MFT after being treated with the flocculant-coagulant system. As can be seen from FIG. 13, there was no clear settlement of the floc aggregates.

Table 2 shows the absolute number of flocs and floc aggregates in different size ranges for Example 7 and Comparative Example. The chord frequencies (counts) were square weighted, so that information complementary to that in FIG. 7 was obtained. Table 2 shows that the number of chords in the small size range (<10 μm, 10-50 μm) were more with the flocculant-coagulant system than with the dual flocculant system, whereas the number of chords in the large size range (>150 μm) were more with the dual-flocculant system. The fact that the dual-flocculant system produced larger and more stable flocs was also reflected in the un-weighted median and in the square-weighted mean value of floc size.

TABLE 2

Counts of Particles in Samples

| Statistics of Counts | Initial – A + C (Comparison) | Initial – A + B | Intermediate – A + C (comparison) | Intermediate – A + B | Final – A + C (comparison) | Final – A + B |
|---|---|---|---|---|---|---|
| Median | 13.61 | 9.29 | 13.32 | 18.99 | 15.38 | 19.22 |
| Mean (Sqr Wt) | 97.47 | 57.27 | 250.72 | 303.58 | 236.47 | 313.02 |
| Counts <10 μm | 24,587 | 48,661 | 17,054 | 9,594 | 12,359 | 10,549 |
| Counts 10-50 μm | 34,138 | 40,133 | 16,673 | 12,922 | 13,217 | 15,775 |
| Counts 50-150 μm | 6,812 | 2,961 | 5,545 | 5,802 | 5,546 | 6,237 |
| Counts 150-300 μm | 411 | 37 | 2,010 | 2,451 | 2,849 | 2,497 |
| Counts 300-1000 μm | 4 | 0.00 | 382 | 645 | 388 | 495 |

As can be seen from the results of Example 6 and comparative Example 7, using a dual-flocculant system as described in Example 6 can provide larger and stronger floc aggregates, as compared with a flocculant-coagulant system as used in comparative Example 7. As a result, fines may settle out of the MFT as floc aggregates and a clear supernatant may be obtained with the dual-flocculant system. The larger and stronger floc aggregates may be further compressed to form cakes with sufficient shear strength to meet the requirement of Directive 074.

Example 8

Tests were conducted to study the effects of injection rates in an example flocculation process where the anionic and cationic flocculants were injected into MFT slurry through separate inline mixers.

Figure 14:
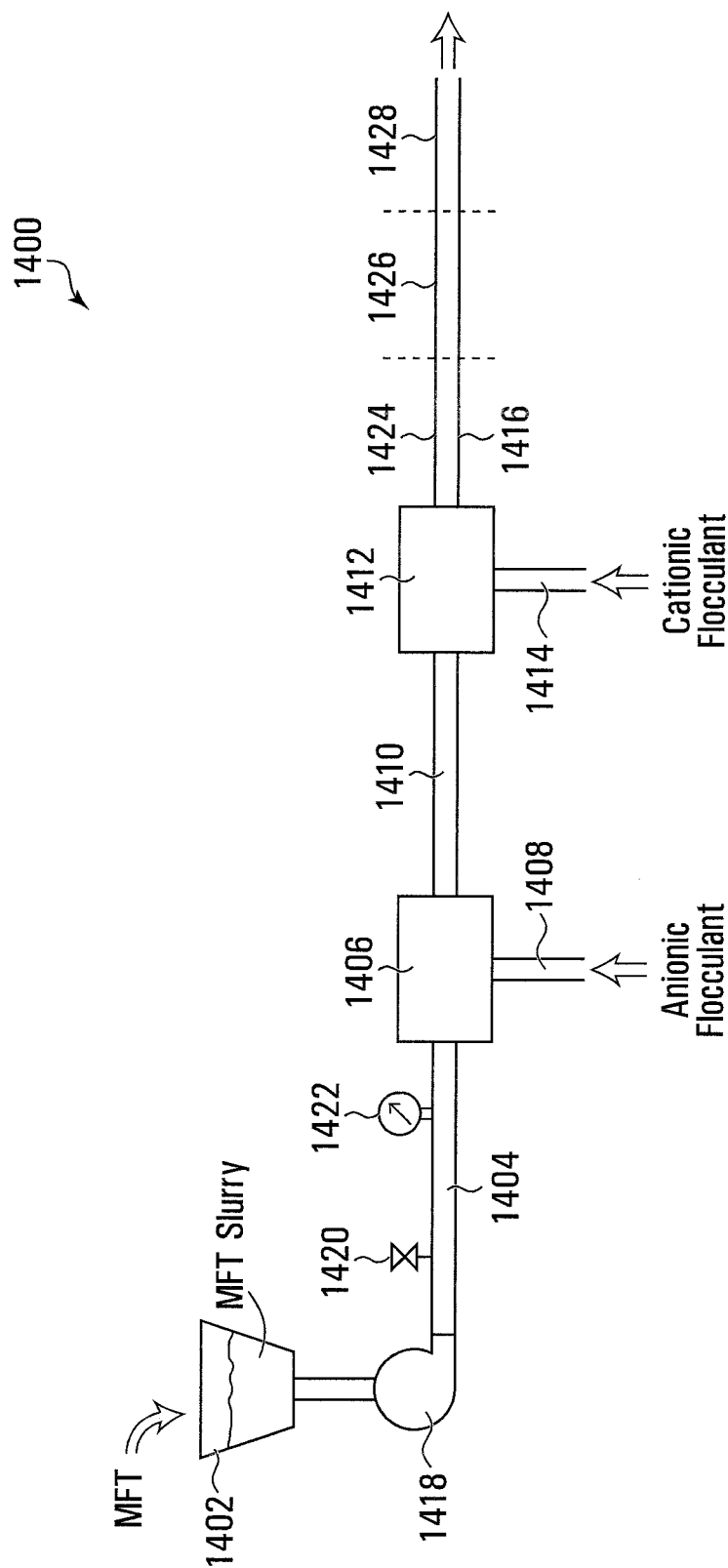
FIG. 14 is a schematic diagram illustrating an exemplary system with in-line mixers for flocculating a slurry, exemplary of an embodiment of the present invention.

A schematic diagram of the flow system set-up used is shown in FIG. 14. As depicted, MFT sample was introduced into the flow system 1400 through a MFT tank 1402, which was connected by a pipeline 1404 to a first inline mixer 1406. Inline mixer 1406 had two input ports, one connected to pipeline 1404 and the other connected to a pipeline 1408. Inline mixer 1406 also had an output port connected to pipeline 1410, which was connected to an input port of a second inline mixer 1412. Inline mixer 1412 had another input port connected to a pipeline 1414 and an output port connected to an output pipeline 1416. Fluid flow within the flow system was driven by a pump 1418 in pipeline 1404. A pressure relief valve 1420 and a flow meter 1422 were also provided on pipeline 1404. Air vents and sampling pods (not shown) were provided at different locations in the flow system for convenient operation and measurement.

MFT tank had 5600 L capacity and a conical bottom.

The pipelines were made of 3" OD plastic pipes or flexible hoses, or a combination thereof. Pipes were mounted on the inline mixers using flanges (not separately shown). Parts of the pipelines were made of transparent plastics for easy observation. The pipeline sections were connected by cam locks. The flexible hoses allowed convenient adjustment of the distance between the inline mixers, which was maintained at about 10 ft during the tests. Pipeline 1416 had two transparent plastic sections 1424, 1428 connected by a flexible section 1426. Section 1424 was about 12 ft long, and section 1426 was about 20 ft long.

Pump 1418 was a progressive cavity pump with a rated capacity of 10 m³/hr. Flow meter 1422 was an ultrasonic flow meter from Siemens.

Inline mixers 1406, 1412 were Flocmaster V3 inline mixers with variable operation speeds from 0 to 3000 rpm.

Figure 15:
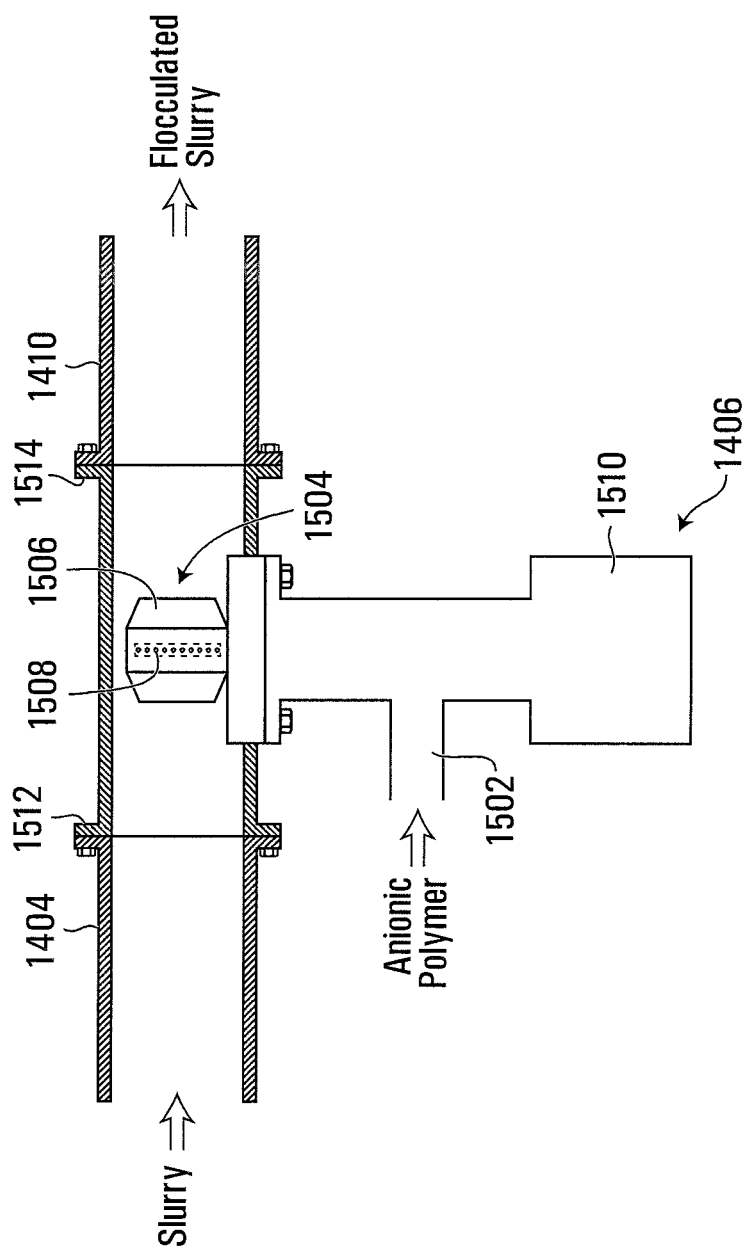
FIG. 15 is a partial cross-sectional and schematic view of a component in the system of FIG. 14.

The constructions and operations of Flocmaster V3 inline mixers are known to those skilled in the art and will not be discussed in detail herein, but a schematic diagram is shown in FIG. 15 to illustrate how in-line mixer 1406 was operated to disperse the anionic polymer. In-line mixer 1406 had input and output ends 1512, 1514 coupled to pipelines 1404 and 1410 respectively, and a mixing chamber 1516, through which the slurry would pass. In-line mixer 1406 had an inlet 1502 connected to a source of the anionic polymer. A rotatable distribution head 1504 was disposed in the mixing chamber 1516 (and thus the slurry path). Mixing blades (impellers) 1506 and distributed flocculant outlets 1508 were provided on the rotatable distribution head 1504. The flocculant outlets 1508 were in fluid communication with the inlet 1502. A variable speed rotator 1510 was provided for rotating the distribution head 1504 at a selected speed.

The structure and operation of in-line mixer 1412 were similar to those of in-line mixer 1406, except that the flocculant inlet of in-line mixer 1412 was connected to a source of the cationic polymer.

An anionic polymer solution containing tap water and 0.5 wt % of anionic flocculant A and a cationic polymer solution containing tap water and 0.5 wt % of cationic flocculant B were prepared using Nalco Mini Feeders and stored in 1000 L Shutz totes respectively for full activation. Recirculation loops were provided to allow the polymer solutions discharged from the polymer solution mixing tanks to be recycled back to the mixing tanks when the inline mixers were not in operation and were used to keep the polymer solutions in the totes well mixed. It typically took about 30 minutes to fully activate the polymer solutions.

In a test process, the sample neat MET slurry as described above was introduced into MET tank 1402, and diluted to 23 wt % solids from the original 37 wt % solids using municipal tap water with an agitator (not shown).

For the purpose of simulating practical operation, NaCl was added to the diluted slurry to increase the salt contents in the slurry to 525 mg/L, which is expected to be similar to the salt content in a typical commercial operation, usually in the range of 500 to 600 mg/L.

The diluted and salted slurry stream was pumped through pipelines 1404, 1410, 1416. The prepared anionic polymer solution was injected into the stream through inline mixer 1406. The prepared cationic polymer solution was injected into the stream through inline mixer 1412. The flow rate of the slurry stream and the injection rates of the polymer solutions were controlled and varied.

The slurry stream flow rate was measured using flow meter 1422. The injection rates of the polymer solutions were measured by measuring the flow rates in pipelines 1408 and 1414 respectively using magnetic flow meters (not shown) placed downstream of the pumps (not shown) used to feed the polymer solutions into pipelines 1408 and 1414.

The operation speeds of inline mixers 1406 and 1412 were varied in different tests.

The slurry output from pipeline 1416 is collected in a container tank (not shown) for further processing or testing.

The duration of each test run was about 2 to 5 min to ensure a steady state was achieved, indicated by the reading on flow meter 1422. Flow rate of the slurry stream was adjusted by controlling the pumping speed of pump 1418. Once the flow rate was stabilized, polymer solutions were fed into the slurry stream, and the injection rate was stabilized as indicated by the magnetic flow meters mentioned above. Inline mixers 1406 and 1412 were turned on at this time at a selected paddle speed. A steady state of the flow system could typically be reached in about 1 min.

The output flocculated slurry stream could be visually inspected at pipeline sections 1424 and 1428.

During testing, ball valves (not shown) were used in downstream output pipelines to collect and observe flocs before the output slurry was collected in the collection tank (not shown). It was found that passage through the ball valves destroyed some flocs in the slurry. Thus, visual observation at pipeline sections 1424 and 1428 provided better representation of the flocculation results achieved after inline mixer 1412, as compared to observations of the slurry collected in the collection tank.

The observation results from representative test runs are summarized in Table 3.

TABLE 3

Representative results at different mixing speeds and dosages

| Run | Flow Rate (L/hr) | Anionic dosage (kg/DT) | Cationic dosage (kg/DT) | Anionic mixer speed (rpm) | Cationic mixer speed (rpm) | Observation |
|---|---|---|---|---|---|---|
| 1 | 1100 | 0.27 | 0.12 | 600 | 600 | No flocs |
| 2 | 1100 | 1.07 | 0.50 | 600 | 600 | Good flocs, released water clear |
| 3 | 1100 | 0.27 | 0.12 | 900 | 900 | Pin flocs |
| 4 | 980 | 1.20 | 0.56 | 600 | 600 | Good flocs, released water clear |
| 5 | 4000 | 1.20 | 0.55 | 500 | 500 | Flocs (overdosed) |
| 8 | 2000 | 1.17 | 0.55 | 300 | 600 | Lumpy flocs (overdosed) |
| 7 | 2000 | 1.17 | 0.68 | 300 | 900 | Satisfactory flocs, released water clear |

In Table 3, flow rate refers to the flow rate of the slurry stream as measured at flow meter 1422. Anionic dosage refers to the dosage of activated anionic polymer flocculant. Cationic dosage refers to the dosage of activated cationic polymer flocculent. Anionic mixer speed refers to the paddle speed of mixer 1406. Cationic mixer speed refers to the paddle speed of mixer 1412. Observation indicates the visual inspection results at pipeline section 1424 or 1428. Flocs were considered "good" when aggregates of solid particles and clear free water were observed. "Pin" flocs were of smaller sizes, but slightly larger than the primary fine particles. "Lumpy" flocs were of larger sizes but the released water still contained observable fine particles, indicating that a significant portion of the fine particles had not been sufficiently flocculated and the particle size polydispersity was very large, which is expected to be a result of improper or insufficient mixing of the polymer solutions into the slurry.

The observed results indicate that both dosages and mixer speeds affect the flocculation performance, and optimal flocculation results were achieved in Runs 2 and 4. It was also observed that clear water and flocs were spatially separated in pipeline section 1424 in Runs 2 and 4, but at higher slurry flow rates (>~2000 L/hr) such separation was not observed, although free released water between the flocs was still clearly visible.

From these results, it was expected that for better performance, the mixer speeds should be sufficiently high.

From the test runs, the operation parameters for Runs 2 and 4 were considered optimal for MET flow rate of 1000 L/hr.

If the mixer speeds were too low for given flocculation dosages, even when the slurry flow rate was high or increased, the flocculation results were still poor as if the slurry had been overdosed with the flocculants (compare results of Runs 4 and 5).

Even at the optimal flocculation dosages (anionic dosage: about 1.20; cationic dosage: about 0.55), when the anionic mixer speed was decreased by half from the optimal speed, lumpy flocs were formed, despite that the cationic mixer remained at the optimal mixing speed (compare results of Runs 4 and 6).

However, by slightly increasing the cationic dosage and increasing the cationic mixer speed to an adequate higher speed, satisfactory results were again achieved (see Run 7, as compared to Run 6).

When the mixer speeds were too high (>900 rpm) floc breakdown were observed (the results of these runs were not shown in Table 3).

It would also be expected that the optimal dosages of the flocculants are dependent on the amount of mixing energy available (which in turn depends on the mixer speeds in the test examples).

The test results also show that the use of inline mixers with variable mixing speeds (such as provided in FLOC-MASTER™ inline mixers) allows added control of the mixing process by varying the mixing energy input. This enhances the Control of the flocculation process.

It is expected that the viscosity of the polymer solutions fed into the flow system may have an impact on the suitable mixing speed. For example, if the polymer concentration in the polymer solution is increased from 0.5 wt % to 1 wt %, it could be expected that the viscosity of the polymer solution will also increase. With a higher polymer concentration in the polymer solution, and a consequent increase of the viscosity of the polymer solution, the mixing energy required to adequately mix the slurry and the polymer solutions is expected to increase. This can be achieved by increasing, for example, the paddle speed in the inline mixer used.

It is further expected that using flocculation solutions with higher concentrations of (polymer) flocculants can significantly reduce the total amount of water required in the process. Further, press cycle time may be decreased and process economics may be improved.

It will be understood that any singular form is intended to include plurals herein. For example, the word "a", "an" or "the" is intended to mean "one or more" or "at least one". Plural forms may also include a singular form unless the context clearly indicates otherwise.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used. For any list of possible elements or features provided in this specification, any sub-list falling within the given list is also intended.

Similarly, any range of values given herein is intended to specifically include any intermediate value or sub-range within the given range, and all such intermediate values and sub-ranges are individually and specifically disclosed.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A dewatering process comprising, in order: combining an anionic polymer flocculant with oil sands fine tailings to form a flocculated slurry, wherein water is in said slurry to allow uniform dispersion of polymer flocculants and reconfiguration of polymer flocculants in said slurry to form flocs having an average floc size in the range of 100 to 10,000 μm; adding a cationic polymer flocculant to the flocculated slurry to form floc aggregates, wherein said cationic polymer flocculant has a molecular weight of at least 5,000,000 Da, wherein said cationic polymer flocculant has a cationic mole charge from about 30% to about 70% and is a polydimethylaminoethylacrylate methyl chloride, a polydimethylaminoethylmethacrylate methyl chloride, a polydimethylaminoethylmethacrylate methyl sulfate, a polydimethylaminoethylacrylate methyl sulfate, a polydimethylaminoethylmethacrylate benzyl chloride, a polydimethylaminoethylacrylate benzyl chloride, a polytrimethylammonium propyl methacrylamide chloride, a polyacrylamidopropyltrimethylammonium chloride, an acrylamide-dimethylaminoethylacrylate methyl chloride copolymer, an acrylamide-dimethylaminoethylmethacrylate methyl chloride copolymer, an acrylamide-dimethylaminoethylmethacrylate methyl sulfate copolymer, an acrylamide-dimethylaminoethylacrylate methyl sulfate copolymer, an acrylamide-dimethylaminoethylmethacrylate benzyl chloride copolymer, an acrylamide-dimethylaminoethylacrylate benzyl chloride copolymer, an acrylamide-trimethylammonium propyl methacrylamide chloride copolymer, or an acrylamide-acrylamidopropyltrimethylammonium chloride copolymer, and wherein the floc aggregates have an average floc aggregate size in the range of 100 to 10,000 μm; and compressing said floc aggregates to remove water and form a dewatered compact.

2. The process of claim 1, wherein said slurry has a solid content of less than or equal to 35 wt %, and said compact has a water content of less than 55 wt %.

3. The process of claim 1, wherein said anionic polymer flocculant has an anionic mole charge from about 30% to about 40%, and is a polyacrylamide, a polyacrylate, a poly(meth)acrylate, a poly 2-acrylamido-2-methylpropane sulfonic acid, an acrylamide sodium acrylate copolymer, an acrylamide sodium(meth)acrylate copolymer, an acrylamide/ammonium acrylate copolymer, an acrylamide ammonium(meth)acrylate copolymer, an acrylamide sodium 2-acrylamido-2-methylpropane sulfonic acid copolymer, an acrylamide ammonia 2-acrylamido-2-methylpropane sulfonic acid copolymer, a hydrolyzed acrylamide 2-acrylamido-2-methylpropane sulfonic acid copolymer, or an acrylamide/2-acrylamido-2-methylpropane sulfonic acid/ammonium acrylate terpolymer.

4. The process of claim 3, wherein said anionic polymer flocculant is an acrylamide sodium acrylate copolymer having a molecular weight of at least 5,000,000 Da, and said anionic mole charge is about 30%.

5. The process of claim 1, wherein said cationic polymer flocculant is a polyacrylamide-polydimethylaminoethylacrylate methyl chloride copolymer and the cationic mole charge is about 50% and wherein the anionic polymer is an acrylamide sodium acrylate copolymer.

6. The process of claim 1, wherein said cationic polymer flocculant is a linear or branched polyacrylamide polydimethylaminoethylacrylate methyl chloride copolymer, and the cationic mole charge is from 50% to 70%.

7. The process of claim 1, wherein said anionic polymer flocculant is dispersed in said slurry at a dosage of about 1 to about 2 kg/DT solids; and said cationic polymer flocculant is dispersed in said flocculated slurry at a dosage of at about 0.1 to about 1 kg/DT solids.

8. The process of claim 1, further comprising dispersing a cationic coagulant in said flocculated slurry to coagulate unflocculated fines prior to the compressing.

9. The process of claim 8, wherein said cationic coagulant is an epichlorohydrin/dimethyl amine polymer or a diallyldimethylammonium chloride polymer, and wherein said cationic coagulant has an intrinsic viscosity between about 0.08 to about 1.3 dL/g.

10. The process of claim 9, wherein said cationic coagulant is dispersed in said flocculated slurry at a dosage of about 0.1 to about 1.5 kg/DT solids.

11. The process of claim 1, wherein said compressing comprises compressing said floc aggregates with a filter press to form said compact.

12. The process of claim 1, wherein said compressing comprises compressing said floc aggregates for a sufficient time to form a compact having a shear strength of 5 kPa or higher and a solid content of about 47 wt % or higher.

13. The process of claim 1, comprising adding water to said slurry before dispersing said anionic polymer flocculant in said slurry.

14. The process of claim 1, wherein said dispersing said anionic polymer flocculant and dispersing said cationic polymer flocculant comprise:
flowing a stream of said slurry through a conduit;
injecting said anionic polymer flocculant into said stream through a first inline mixer coupled to said conduit; and
injecting said cationic polymer flocculant into said stream through a second inline mixer coupled to said conduit downstream of said first inline mixer.

15. The process of claim 14, wherein said first and second inline mixers each comprises:
an inlet for receiving the respective flocculant,
a rotatable distribution head disposed in said conduit, comprising mixing blades and distributed flocculant outlets in fluid communication with said inlet, and
a variable speed rotator for rotating said distribution head at a speed selected to adjust the mixing energy impacted to said stream.

16. The process of claim 15, wherein the flow rate of said stream in said conduit, the rate of injection of said anionic polymer flocculant and rate of injection of said cationic polymer flocculant, and said speed of rotation of said distribution head are selected to optimize flocculation in said flocculated slurry.

* * * * *

UNITED STATES PATENT AND TRADEMARK OFFICE
CERTIFICATE OF CORRECTION

PATENT NO. : 9,963,365 B2
APPLICATION NO. : 13/800808
DATED : May 8, 2018
INVENTOR(S) : William T. Duttlinger, Jr. et al.

It is certified that error appears in the above-identified patent and that said Letters Patent is hereby corrected as shown below:

On the Title Page

(71) Applicant: "ECOLAB USA INC., Naperville, IL (US)" - should be - ECOLAB USA INC., St. Paul, MN (US)

(72) Inventors: "William T. Duttlinger, Jr., Oswego, IL (US); Anoop Chengara, Hoffman Estates, IL (US); Kimberly Jantunen Cross, Hoffman Estates, IL (US); Anthony G. Sommese, Aurora, IL (US)" - should be - William T. Duttlinger, Jr., Houston, TX (US); Anoop Chengara, Aurora, IL (US); Kimberly Jantunen Cross, Batavia, IL (US); Anthony G. Sommese, Aurora, IL (US)

Signed and Sealed this
Tenth Day of July, 2018

Andrei Iancu
*Director of the United States Patent and Trademark Office*